United States Patent [19]

Lennon et al.

[11] 4,193,131

[45] Mar. 11, 1980

[54] CRYPTOGRAPHIC VERIFICATION OF OPERATIONAL KEYS USED IN COMMUNICATION NETWORKS

[75] Inventors: Richard E. Lennon, Woodstock; Stephen M. Matyas, Poughkeepsie; Carl H. W. Meyer, Kingston; Jonathan Oseas, Hurley; Paul N. Prentice, Hyde Park; Walter L. Tuchman, Woodstock, all of N.Y.

[73] Assignee: International Business Machines Corporation, Armonk, N.Y.

[21] Appl. No.: 857,546

[22] Filed: Dec. 5, 1977

[51] Int. Cl.² .............................................. H04L 9/00
[52] U.S. Cl. .................................... 375/2; 340/149 R
[58] Field of Search ......... 178/22; 340/149 R, 149 A; 364/200, 900

[56] References Cited

U.S. PATENT DOCUMENTS

| 3,611,293 | 10/1971 | Constable et al. | 340/149 A |
| 3,798,605 | 3/1974 | Feistel | 364/200 |
| 3,862,716 | 1/1975 | Black et al. | 340/149 A |
| 3,990,558 | 11/1976 | Ehrat | 340/149 R |
| 4,023,013 | 5/1977 | Kinker | 340/149 A |
| 4,087,856 | 5/1978 | Attanasio | 364/200 |

OTHER PUBLICATIONS

Diffie et al., "New Directions in Cryptography," *IEEE Transactions on Information Theory*, vol. IT-22, No. 6, Nov. 1976, pp. 644–654.

Diffie et al., "Multiuser Cryptographic Techniques," *AFIPS Conference Proceedings*, vol. 45, N.C.C., 1976, pp. 109–112.

*Primary Examiner*—Howard A. Birmiel
*Attorney, Agent, or Firm*—Edwin Lester

[57] ABSTRACT

In a data communication network providing communication security for communication sessions between a first station and a second station where each station has cryptographic apparatus provided with an operational key which should be common to both stations for cryptographic operations, an operational key verification arrangement is provided in which a first number provided at the first station is operated upon in accordance with the first station operational key to obtain cryptographic data for transmission to the second station, requiring the second station to perform an operation on the first station cryptographic data in accordance with the second station operational key to obtain cryptographic data for transmission back to the first station and performing an operation at the first station in accordance with the first number and the second station cryptographic data to verify that the second station is the source of second station cryptographic data only if the operational keys are identical.

11 Claims, 17 Drawing Figures

CRYPTO VERIFICATION OF STATION 1 OPERATIONAL KEY

CRYPTO VERIFICATION OF STATION 2 OPERATIONAL KEY

CRYPTOGRAPHIC VERIFICATION OF OPERATIONAL KEYS USED IN COMMUNICATION NETWORKS

CROSS REFERENCE TO RELATED APPLICATIONS

This application is related to the following patent applications which are concurrently filed herewith and assigned to the same assignee as the patent application;
1. "Cryptographic Communication and File Security Using Terminals", Ser No. 857,533, filed Dec. 5, 1977, By Ehrsam et al.
2. "Cryptographic Communication Security for Single Domain Networks", Ser. No. 857,532, filed Dec. 5, 1977, by Ehrsam et al.
3. "Cryptographic File Security for Single Domain Networks", Ser. No. 857,534, filed Dec. 5, 1977, by Ehrsam et al.
4. "Cryptographic Communication Security for Multiple Domain Networks", Ser No. 857,531, filed Dec. 5, 1977, by Ehrsam et al.
5. "Cryptographic File Security for Multiple Domain Networks" Ser No. 857,535, filed Dec. 5, 1977, by Ehrsam et al.

BACKGROUND OF THE INVENTION

This invention relates to cryptographic communication security techniques and, more particularly, to an operational key verification arrangement for verifying at a first station that a second station is the source of cryptographic data communicated to the first station only if the operational keys of both stations are identical.

With the increasing number of computer end users, sharing of common system resources such as files, programs and hardware and the increasing use of distributed systems and telecommunications, larger and more complex computer base information systems are being created. In such systems, an increasing amount of sensitive data may be transmitted across unsecure communication lines. Because of the insecurity of communication lines, there is an increasing concern over the interception or alteration of sensitive data which must pass outside a controlled or protected environment or which may become accessible if maintained for too long a period of time. Cryptography has been recognized as an effective data security measure in that it protects the data itself rather than the medium over which it is transmittted or the media on which it is stored.

Cryptography deals with methods by which message data called cleartext or plaintext is encrypted or enciphered into unintelligible data called ciphertext and by which the ciphertext is decrypted or deciphered back into the plaintext. The encipherment/decipherment transformations are carried out by a cipher function or algorithm controlled in accordance with a cryptographic or cipher key. The cipher key selects one out of many possible relationships between the plaintext and the ciphertext. Various algorithms have been developed in the prior art for improving data security in data processing systems. Examples of such algorithms are described in U.S. Pat No. 3,796,830 issued Mar. 12, 1974 and U.S. Pat. No. 3,798,359 issued Mar. 19, 1974. Another more recent algorithm providing data security in data processing systems is described in U.S. Pat. No. 3,958,081 issued May 18, 1976. This algorithm was adopted by the National Bureau of Standards as a data encryption standard (DES) algorithm and is described in detail in the Federal Information Processing Standards publication, Jan. 15, 1977, FIPS PUB 46.

A data communication network may include a complex of communication terminals connected via communication lines to a single host system and its associated resources such as the host programs and locally attached terminals and data files. Within the data communication network, the domain of the host system is considered to be the set of resources known to and managed by the host system. As the size of data communication networks increases, other host systems may be brought into the network to provide multiple domain networks with each host system having knowledge of and managing its associated resources which make up a portion or domain of the network. By providing the proper cross domain data link between the domains of the network, two or more domains may be interconnected to provide a networking facility. Accordingly, as the size of the network increases and the number of communication lines interconnecting the domains of network increases, there is an increasing need to provide communication security for data transmitted over such communication lines connecting the domains of a multiple domain communication network. Various data communication networks have been developed in the prior art using cryptographic techniques for improving the security of data communication within the network. In such networks, a cryptographic facility is provided at the host system and at various ones of the remote terminals. In order for the host system and a remote terminal to perform a cryptographic communication, both must use the same cryptographic algorithm and a common operational key so that the data enciphered by the sending station can be deciphered at the receiving station. In prior art cryptographic communication arrangements, the operational key to be used at the sending station is communicated by mail, telephone or courier to the receiving station so that a common operational key is installed at both stations to permit the cryptographic communications to be performed. Other prior art arrangements developed techniques which permitted the communication line connecting the two stations to be used for communicating the operational key from one station to the other station by enciphering the operational key in a form which is recoverable at the receiving station as exemplified by the Consumer Transaction Facility described in U.S. Pat. No. 3,956,615 issued May 11, 1976.

With such an arrangement, an opponent who attempts to intercept data communications over the communication line to recover the communicated operational key in order to be able to decipher subsequent cryptographic data communications over the communication line will be blocked inasmuch as he does not have available to him the cipher key under which the operational key is enciphered. One way in which he may be able to make use of the intercepted enciphered operational key and cryptographic data communications is to make an attack at the station for which the message was intended and gain access to that station so that he may play a recording of the enciphered operational key into the cryptographic apparatus of that station which will then decipher the enciphered operational key after which he may then play a recording of the cryptographic data communication into the cryptographic apparatus of that station and obtain the data communication in clear form.

Accordingly, it is an object of the invention to maintain communication security of data transmissions between stations connected by a communication line.

Another object of the invention is to verify at a cryptographic station the source of communicated cryptographic data.

A further object of the invention is to maintain communication security of data transmissions between a first cryptographic station and a second cryptographic station by verifying that both stations are using a common operational key.

Still another object of the invention is to send a challenge from a first cryptographic station in accordance with its operational key to a second cryptographic station requiring the second station to return a cryptographic message in accordance with its operational key in such a form that the first station can verify that the second station is the source of the cryptographic message only if the operational keys of both stations are identical.

In a data communication network providing data communications between a first cryptographic station provided with a first operational key and a second cryptographic station provided with a second operational key, an operational key verification arrangement is provided in accordance with the invention in which the first station provides a first verification number and then performs a first operation in accordance with the first verification number and the first operational key to provide first station ciphertext for transmission to the second station. At the second station, an operation is performed in accordance with the first station ciphertext and the second operational key to provide second station ciphertext for transmission back to the first station and performing a second operation at the first station in accordance with the first verification number and the received second station ciphertext to verify that the second station is the source of the second station ciphertext only if the operational keys of the two stations are identical.

In the verification arrangement of the present invention, the first station ciphers the first verification number under control of the first operational key to provide first station ciphertext for transmission to the second station. The second station ciphers the first station ciphertext under control of the second operational key to obtain a second verification number which is equal to the first verification number if the operational keys of the two stations are identical. The second verification number is then modified in accordance with a first function to obtain a modified second verification number which is then ciphered under control of the second operational key to provide second station ciphertext for transmission back to the first station.

Various embodiments of verification at the first station are provided by the present invention. In one embodiment, the second station ciphertext received at the first station is ciphered under control of the first operational key to obtain a first resulting number which is equal to the modified second verification number if the operational keys of the two stations are identical. The first resulting number is then modified by a second function which is the inverse of the first function to obtain a second resulting number which is equal to the first verification number if the operational keys of the two stations are identical. The first verification number is compared with the second resulting number for equality to verify that the second station is the source of the cryptographic data communication only if the operational keys of the two stations are identical.

In another embodiment of the verification at the first station, the second station ciphertext received at the first station is ciphered under control of the first operational key to obtain a first resulting number which is equal to the modified second verification number, previously produced by the second station, if the operational keys of the two stations are identical. The first station then modifies the first verification number by a second function which is identical to the first function, previously performed at the second station, to obtain a modified first verification number which is equal to the modified second verification number, previously produced by the second station, if the operational keys of the two stations are identical. The modified first verification number is then compared with the first resulting number for equality to verify that the second station is the source of the cryptographic data communication only if the operational keys of the two stations are identical.

In another embodiment of the verification at the first station, the second station ciphertext, which represents the modified second verification number ciphered under the second operational key, is received and stored at the first station. The first station then modifies the first verification number by a second function which is identical to the first function, previously performed at the second station, to obtain a modified first verification number which is equal to the modified second verification number previously produced by the second station if the operational keys of the two stations are identical. The modified first verification number is then ciphered under the first operational key to obtain additional first station ciphertext which is then compared with the received second station ciphertext for equality to verify that the second station is the source of the second station ciphertext only if the operational keys of the two stations are identical.

The foregoing and other objects, features and advantages of the invention will be apparent from the following particular description of preferred embodiments of the invention, as illustrated in the accompanying drawings.

BRIEF DESCRIPTION OF THE DRAWINGS

FIGS. 10a and 10b, taken together, comprise a detailed schematic diagram of one embodiment of the verification arrangement of the present invention illustrating a data communication from a first station to a second station.

FIGS. 11a and 11b, taken together, comprise a detailed schematic diagram of one embodiment of the verification arrangement of the present invention illustrating a data communication from the second station to the first station.

GENERAL DESCRIPTION

INTRODUCTION

Figure 1:
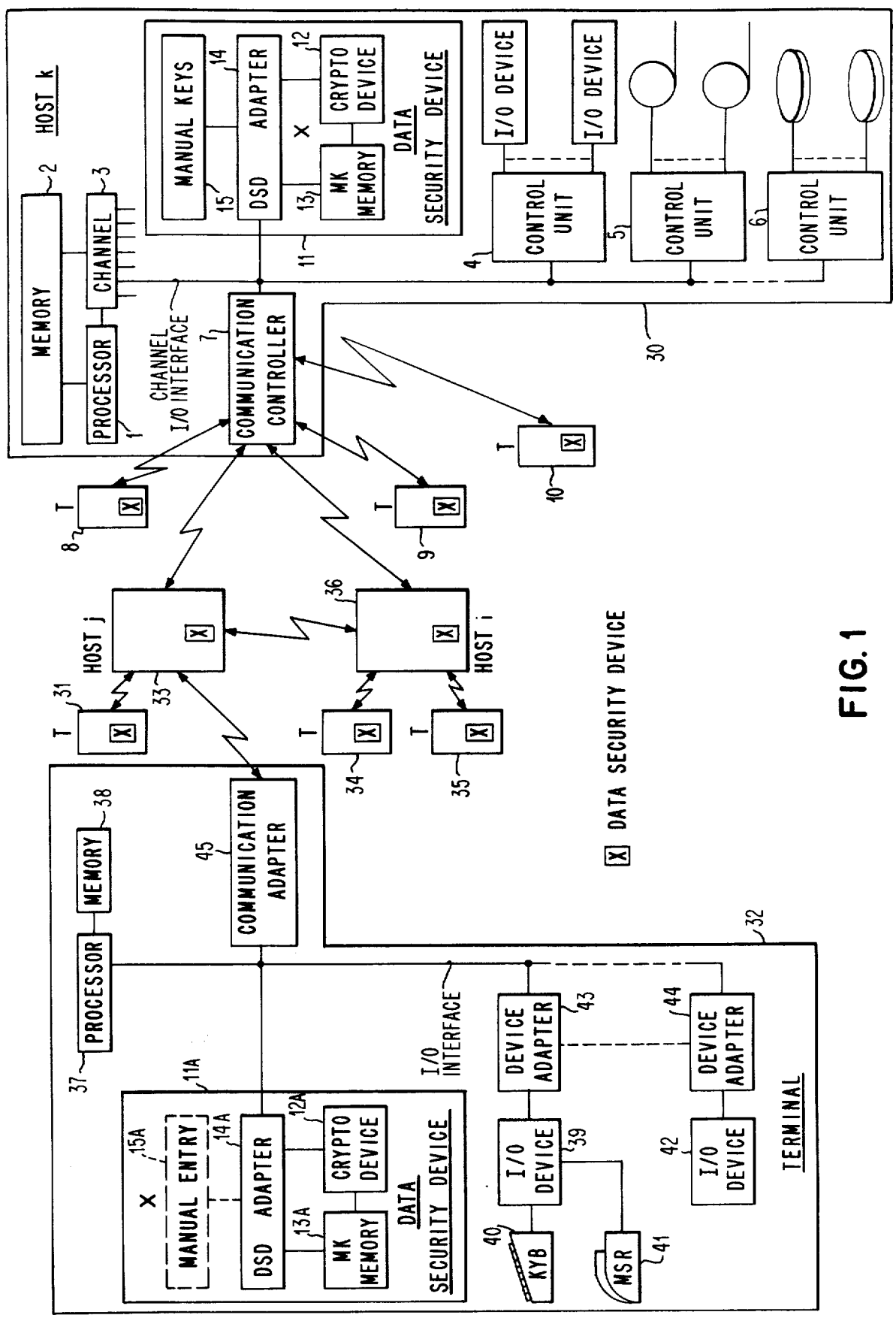
FIG. 1 is a block diagram of a representative data communication network illustrating, in block form, the details of a terminal and a host system in such a network.

In a single domain data communication network, a complex of communication terminals are connected via a plurality of communication lines to a host data processing system and its associated resources such as host programs, and locally attached terminals and secondary storage files. Because of the complexity and increasing size of such networks other host systems may be brought into the network by providing the proper cross domain link between the multiple systems thereby providing a multiple domain network. However, with this increasing size of the network, the problem of transmitting data over unsecure communication lines becomes more acute and it is necessary to protect the data to maintain the confidentiality and integrity of the information represented by that data. Cryptography provides an effective data security measure for communication security in that it protects the confidentiality and integrity of the data itself rather than the medium over which it is transmitted.

Most practical cryptographic systems require two basic elements, namely, (1) a cryptographic algorithm which is a set of rules that specify the steps required to transform or encipher plaintext into ciphertext or to tranform or decipher ciphertext back into plaintext and (2) a cipher key. The cipher key is used to select one out of many possible relationships between the plaintext and the ciphertext. Various cryptographic algorithms have been developed in the prior art for improving data security in data processing systems. One such algorithm is described in U.S. Pat. No. 3,958,081 issued May 18, 1976 and was recently adopted as a U.S. Federal Data Processing Standard as set forth in the aforementioned Federal Information Processing Standard publication. The cryptographic algorithm operates to transform or encipher a 64 bit block of plaintext into a unique 64 bit block of ciphertext under control of a 56 bit cipher key or to transform or decipher a 64 bit block of ciphertext back into an original 64 bit block of plaintext under control of the same 56 bit cipher key with the deciphering process being the reverse of the enciphering process. The effectiveness of this cipher process depends on the techniques used for the selection and management of the cipher key used in the cipher process. The only cipher key actually used in the cipher process to personalize the algorithm when encrypting or decrypting data or other keys is termed the working key and is accessible only by the cryptographic apparatus. All other keys hereafter discussed are used at different times as working keys depending upon the cipher operation to be performed.

There are basically two categories of cipher keys used in the cryptographic system, namely, operational keys (KO) and key encrypting keys (KEK) with operational keys being referred to and used as data encrypting keys. Data encrypting or operational keys are a category of keys used to encrypt/decrypt data while key encrypting keys are a category of keys used to encrypt/decrypt other keys.

Within the two basic categories, there are variously defined classes and types of cipher keys. Thus, in the data encrypting or operational class of cipher keys, the data encrypting or operational key which protects data during data communication sessions is a class of key called the primary communication key. One type of this class of keys is one which is a system generated, time variant, dynamically created key transmitted in enciphered form under a key encrypting key from a host system to a remote terminal. The key is deciphered at the terminal and then loaded into the working key register and used as the working key. The key exists only for the duration of the communication session and will be referred to as the system session key (KS).

Within the key encrypting category of cipher keys, there are two sub-categories, namely, the primary key encrypting key and the secondary key encrypting key. In the primary key encrypting key sub-category of cipher keys, the key encrypting key used in the host system to encipher other keys is a class of key called the systemkey. One type of this class of keys is one which is used to protect the system session keys actively used at the host and will be referred to as the host master key (KMH). In the secondary key encrypting key sub-category of cipher keys, there is a class of key called a secondary communication key which is used to protect other keys. This class of key is used to protect system session keys transmitted to a terminal and when system generated will be referred to as the terminal master key (KMT). Another type of this class of key is used to protect system session keys transmitted from the host system in one domain to a host system in another domain of a multiple domain communication network and will be referred to as a cross-domain key (KNC). An additional type of this class of key is used to protect system session keys transmitted to an application program associated with a host system and when system generated will be referred to as the application key (KNA). The various cryptographic keys defined above are summarized in the following table by category, class, type and use:

| CATEGORY | SECURITY CLASS | TYPE | USE |
|---|---|---|---|
| Key Encrypting Keys (KEK) Primary | System Key | Host Master Key (KMH) | Encipher |

-continued

| CATEGORY | SECURITY CLASS | TYPE | USE |
|---|---|---|---|
| Secondary | Secondary Communication Keys | Terminal Master Key (KMT) Cross-Domain Key (KNC) Application Key (KNA) | Other Cryptographic Keys |
| Data Encrypting Key (Operational Key KO) | Primary Communication Key | System Session Key (KS) | Encipher Or Decipher Data |

Generation, Distribution, Installation and Management of Cryptographic Keys

Key generation is the process which provides for the creation of the cipher keys required by a cryptographic system. Key generation includes the specification of a system master key and primary and secondary communication keys.

The host master key is the primary key encrypting key and is the only cipher key that needs to be present in the host cryptographic facility in clear form. Since the host master key does not generally change for long periods of time, great care must be taken to select this key in a random manner. This may be accomplished by using some random experiment such as coin tossing where bit values 0 and 1 are determined by the occurrence of heads and tails of the coin or by throwing dice where bit values 0 and 1 are determined by the occurrence of even or odd rolls of the dice, with the occurrence of each group of coins or dice being converted into corresponding parity adjusted digits. By enciphering all other cipher keys stored in or passed outside the host system, overall security is enhanced and secrecy for such other cipher keys reduces to that of providing secrecy for the single host master key. Secrecy for the host master key may be accomplished by storing it in a non-volatile master key memory so that the host master key need only be installed once. Once installed, the master key is used only by the cryptographic apparatus for internally deciphering enciphered keys which may then be used as the working key in a subsequent encipher/decipher operation.

Installation of the host master key may be accomplished by a direct manual entry process using mechanical switches, dials, or a hand-held key entry device. Alternately, an indirect entry method may be used in which case the host master key may be entered from a non-volatile media such as a magnetic card or tape which is maintained in a secure location (safe, vault, etc.) accessible only to the security administrator. Another alternative indirect entry method may be to use a keyboard entry device, though this method is subject to human error. In any event, whichever indirect method is chosen, during initialization, the host master key may be read into and temporarily stored in the host memory and then transferred to the master key memory with the host memory entry being subsequently erased so that only one copy is present and accessible only by the cryptographic facility.

The terminal master key is a secondary key encrypting key and like the system master key, is the only key encrypting key that needs to be present in clear form in the terminal cryptographic facility. Since there may be numerous terminals associated with a host system, it may not be practical or prudent to have these keys generated by a human user using some type of random experiment. Therefore, to relieve the system administrator from the burden of creating cryptographic keys, except for the single system master key, the cryptographic apparatus of the host system can be used as a pseudo random generator for generating the required terminal master keys used by the various terminals associated with the host system. The manner by which such host system generated random numbers are produced is described in greater detail in the aforementioned application Ser. No. 857,531, entitled "Cryptographic Communication Security for Single Domain Networks". The clear form of the system generated terminal master key is distributed in a secure manner to the authorized terminal users. This may be accomplished by transporting the key by courier, registered mail, public telephone, etc. The liklihood of an opponent obtaining the key during transit can be lessened by transmitting different portions of the key over independent paths and then combining them at the destination. Once having properly received a valid system or private generated terminal master key in clear form, it becomes necessary to maintain its secrecy. At the terminal, this is accomplished by writing the terminal master key into a non-volatile master key memory, as in the case of the host system master key. Once installed, the terminal master key is used only by the terminal cryptographic apparatus for internally deciphering enciphered system generated primary communication keys which may then be used as the working key in a subsequent encipher/decipher operation.

The cross-domain key is a secondary key encrypting key which is used as a secondary communication key to allow a session key generated at the host system in one domain to be transmitted and recovered at the host system in another domain of a multiple domain communication network. The cryptographic apparatus of the sending host system used as a pseudo random generator, as in the case of generating terminal master keys, can also be used to generate the cross-domain key. Because there may be numerous host systems interconnected in the multiple domain communication network, it is necessary to generate a separate cross-domain key for each cross-domain communication between each host system and the other host systems of the network. As in the case of the terminal master keys, these cross-domain keys must be distributed from each host system to each of the other host systems in the network in a secure manner. This may be accomplished in a similar manner to that described for the distribution of terminal master keys. Once having properly received a valid cross-domain key in clear form at the receiving host system, it becomes necessary to maintain its secrecy. The manner in which this is accomplished is described in detail in the aforementioned application Ser. No. 857,531. However, once installed at the receiving host system in a protected form, the cross-domain key is used only by the receiving host system for internally transforming enciphered session keys transmitted by a sending host system into a form usable by the receiving host system to carry out cryptographic operations.

The application key is a secondary key encrypting key which is used as a secondary communication key to protect the session key generated at a sending host system of a multiple domain network. The session key protected by the application key is transformed into a form usable by the sending host system to carry out cryptographic operations. Since there may be numerous application programs associated with a host system, it is necessary to generate a separate application key for each application program. Therefore, the cryptographic apparatus of a host system may be used as a pseudo random generator, as in the case of generating terminal master keys and cross-domain keys, to generate the application keys for each of the application programs associated with the host system. Once having validly generated a system application key, it becomes necessary to maintain its secrecy. The manner in which this is accomplished is described in greater detail in the aforementioned application Ser. No. 857,531.

System generated primary communication keys, i.e. session keys, are time variant keys which are dynamically generated for each communication session and are used to protect communicated data. Since there may be numerous communications sessions it is impractical to have these keys generated by a human user. Therefore, the cryptographic apparatus of the host system may be used as a pseudo-random generator for generating, as each communication session is required, a pseudo-random number which, in keeping with the objective that cryptographic keys should never occur in the clear, may be defined as being a session key enciphered under the host key encrypting key.

In a multiple domain network when cross domain communication is to be established between a terminal associated with a host system in one domain and an application program associated with a host system in another domain, the generated random number is defined as being the session key enciphered under a host master key. By a technique described in greater detail in the aforementioned application Ser. No. 857,531, the enciphered session key is reenciphered from encipherment under the host master key of the host system in the one domain to encipherment under the cross domain key used for cross domain communication between the respective host systems and is also reenciphered from encipherment under the host master key of the host system in the one domain to encipherment under the terminal master key of the terminal with which the communication session is to be established. Both of these reenciphered session keys are communicated to the host system in the other domain. At the host system in the other domain, the session key enciphered under the cross domain key is reenciphered from encipherment under the cross domain key to encipherment under the host master key of the host system in the other domain. The session key now enciphered under the host master key of the host system in the other domain and the session key enciphered under the terminal master key are then communicated to the application program associated with the host system in the other domain where the session key enciphered under the host master key is retained for cryptographic operations at the host system in the other domain and the session key enciphered under the terminal master key is communicated to the terminal associated with the host system in the one domain. At this point, a common session or operational key is now present in a form usable at the terminal and application program permitting a communication session to proceed between them.

On the other hand, when cross domain communication is to be established between an application program in one domain and an application program in another domain, the generated random number is defined as being the session key enciphered under the application key associated with the application program of the sending host system. By a technique described in greater detail in the aforementioned application Ser. No. 857,531, the enciphered session key in addition to being used for communication to the application program in the host system with which it is associated is also used in a reencipher operation to reencipher the session key from encipherment under the application key to encipherment under the host master key of the host system in the one domain and then the session key now enciphered under the host master key of the host system in the one domain is used in another reencipherment operation to reencipher the session key from encipherment under the host master key to encipherment under the cross domain key used for cross domain communication between the respective host systems of the multiple domain network. The session key enciphered under the application key of the application program associated with the one domain and the session key enciphered under the cross domain key are then communicated to the host system in the other domain. At the host system in the other domain, the session key enciphered under the cross domain key is reenciphered from encipherment under the cross domain key to encipherment under the host master key of the host system in the other domain. The session key now enciphered under the host master key of the host system in the other domain and the session key enciphered under the application key are then communicated to the application program associated with the host system in the other domain where the session key enciphered under the host master key of that host system is retained for cryptographic operations at the host system in the other domain and the session key enciphered under the application key is communicated to the application program associated with the host system in the one domain. The application program then causes another reencipher operation to be performed at the host system in the one domain to reencipher the session key from encipherment under the application key to encipherment under the host master key of the host system in the one domain. At this point, a common session or operational key is now present in usable form at the application programs in the different domains permitting a communication session to proceed between the two application programs.

Data Communication Networks

Modern day data communication networks may include a complex of communication terminals connected via communication lines to a single host and its associated resources such as the host programs and locally attached terminals and data files. As the size of a data communication network increases other host systems may be brought into the network to provide multiple domain networks with each host system having knowledge of and managing its associated resources which make up a portion or domain of the network. By providing the proper cross domain link between the domains of the network, two or more domains may be inter-connected to provide a networking facility. A representative multiple domain network is shown in FIG. 1 with a representative one of the host systems and its associated resources shown in block form and a representative one of the plurality of remote communication terminals associated with a host system also shown in block form. One domain of the network includes the remote communication terminals 8, 9 and 10 connected by communication lines to the Host$^k$ system 30; a second domain of the network includes the remote communication terminals 31 and 32 connected by communication lines to the Host$^j$ system 33 and a third domain of the network includes the remote communication terminals 34 and 35 connected by communication lines to the Host$^i$ system 36.

While the particular manner in which the host is implemented is not critical to the present invention, the block diagram of the host in FIG. 1 shows the data flow and control relationships of a representative host arrangement. The host includes a programmable processor 1 operationally connected to a memory 2 which provides storage for data and the programs which are utilized to control the system and a channel 3 which controls the transfer of data between input/output devices and the processor 1. Channel 3 is connected to the processor 1 and memory 2 and via a channel I/O Interface, with control units such as control unit 4 capable of controlling a cluster of input/output devices which may be display or printer type of devices, control unit 5 capable of controlling a plurality of magnetic tape units or control unit 6 capable of controlling a plurality of disk files. Communication controller 7 is a two-direction control unit that links the host to communication lines connected to remote terminals such as communication terminals 8, 9 and 10 and host systems H$^j$ and H$^i$ each of which is similar to Host$^k$ and also having a plurality of terminals associated therewith.

The collection of data and control lines connected between the channel and I/O control units is commonly referred to as the channel I/O interface providing an information format and signal sequence common to all the I/O control units. The I/O interface lines generally include a data bus out which is used to transmit device addresses, commands and data from the channel 3 to the I/O control unit; a data bus in which is used to transmit device identification, data or status information from the I/O control unit to the channel 3 and tag signal lines which are used to provide signals identifying an I/O operation, the nature of information on the data bus and parity condition. Since each I/O control unit has a unique electrical interface, device adapters are generally provided to allow device connection to the common I/O interface. All I/O data transfers between the processor and the attached control units may be performed in a programmed input/output (PIO) mode on a 1 byte per I/O instruction basis. Included in this organization of a general purpose host system is a host data security device 11.

Such host data security devices and the manner in which they perform cryptographic operations is described in detail in the co-pending application Ser. No. 857,531, entitled "Cryptographic Communication Security for Multiple Domain Networks". Briefly, the host data security device (DSD) 11 includes a crypto device 12, a master key (MK) memory 13, a DSD adapter 14 which connects to the I/O interface and a manual entry device 15 for manually loading a host master key into the MK memory 13. Either one of two methods can be used for writing a host master key into the MK memory 13. The first method for writing the host master key into the MK memory 13 is achieved under program control. In this method, an I/O device having a keyboard, magnetic stripe card reader or the like, may use such elements to cause the host master key to be stored in the host memory 2 as in the case of conventional data entry. Subsequently, under program control, the host master key may be read from the host memory 2 to the MK memory 13 of the DSD. The other method of writing the host master key into the MK memory 13 consists of manually writing the host master key into the MK memory 13 by means of individual toggle or rotary switches. To enable master key writing into the MK memory 13 by either method, an enable write key (EW) switch is provided which is initially turned on when a write master key operation is initiated and turned off at the end of write master key operation. To prevent the key from being changed by unauthorized persons, the EW switch operation may be activated by a physical key lock arrangement.

The DSD adapter 14 serves a dual function namely, providing adapter functions for DSD connection to the I/O interface and control functions for the DSD.

The I/O interface provides the DSD adapter 14 with overall direction, gives it cipher keys to be used, presents it with data to be processed and accepts the processed results. Overall direction is achieved by use of operation commands which are decoded and subsequently provide control in properly timed sequences of signals to carry out each command. These signals are synchronized with the transfer of data in and out. The DSD adapter 14 also controls the placing of cipher keys in the crypto device 12 and directs the crypto device in the enciphering and deciphering operations.

The MK memory 13 is a non-volatile 16×4 bit random access memory (RAM) which is battery powered to enable key retention when host power may not be present. The host master key consists of eight master key bytes (64 bits) each of which consists of seven key bits and one parity bit.

Likewise, while the particular manner in which a communication terminal is implemented is not critical to the present invention, FIG. 1 illustrates in block diagram form a representative communication terminal 32 showing data flow and control relationships. The terminal 32 is generally modular in nature and includes a programmable processor 37 operationally connected to a memory 38 which provides storage for data and the programs which are utilized to control the terminal 32. The processor 37 contains the normal facilities for addressing memory, for fetching and storing data, for processing data, for sequencing program instructions and for providing operational and data transfer control of a single I/O device 39 which may be a display type of device having a keyboard entry unit 40 and/or magnetic stripe card reader entry unit 41 and a single I/O device 42 which may be a printer type of device. The collection of data and control lines connected between the processor 37 and the I/O device or devices is commonly referred to as the I/O interface providing an information format and signal sequence common to all the I/O devices. The I/O interface lines generally include a data bus out which is used to transmit device addresses, commands and data from the processor 37 to the I/O device; a data bus in which is used to transmit device identification, data or status information from the I/O device to the processor 37 and tag signal lines which are used to provide signals identifying an I/O operation, the nature of information on the data bus and parity condition. Since each I/O device has a unique electrical interface, device adapters such as adapters 44 and 45 are generally provided to allow device connection to the common I/O interface. All I/O data transfers between the processor and the attached adapters may be performed in a programmed input/output (PIO) mode on a 1 byte per I/O instruction basis. In addition to the device adapters, a communication adapter 45 is also generally provided to connect the communication terminal 1 via a communication line to a host system. Included in this organization of a general purpose communicaton terminal 32 is a data security device (DSD) 11A containing a crypto device 12A, a master key (MK) memory 13, a DSD adapter 14A which connects to the I/O interface and optionally a manual entry device 15A for manually loading a terminal master key into the MK memory 13. Either one of two methods described above in connection with the host data security device can be used for writing a terminal master key into the MK memory 13A.

The DSD adapter 14A serves a dual functon namely, providing adapter functions for DSD connection to the I/O interface and control functions for the DSD.

The I/O interface provides the DSD adapter 14A with overall direction, gives it cipher keys to be used, presents it with data to be processed and accepts the processed results. Over-all direction is achieved by use of operation commands which are decoded and subsequently provide control in properly timed sequences of signals to carry out each command. These signals are synchronized with the transfer of data in and out. The DSD adapter 14A also controls the placing of cipher keys in the crypto device 12A and directs the crypto device in the enciphering and deciphering operations.

The MK memory 13A is a non-volatile 16×4 bit random access memory (RAM) which is battery powered to enable key retention when terminal power may not be present. The terminal master key consists of eight master key bytes (64 bits) each of which consists of seven key bits and one parity bit. The communication terminals, such as terminal 32, and its data security device and the manner in which the data security device performs cryptographic operations is described in detail in the co-pending application Ser. No. 857,533, filed Dec. 5, 1977 entitled "Cryptographic Communication and File Security Using Terminals" by Ehrsam et al.

The crypto device 12 is the heart of the terminal and host DSD for performing enciphering and deciphering operations and is identical for both units. The crypto device 12 performs encipher/decipher operations on a block cipher basis in which a message block of 8 data bytes (64 bits) is enciphered/deciphered under control of a 56 bit cipher working key to produce an enciphered/deciphered message block of 8 data bytes. The block cipher is a product cipher function which is accomplished through successive applications of a combination of non-linear substitutions and transpositions under control of the cipher working key. Sixteen operation defined rounds of the product cipher are executed in which the result of one round serves as the argument of the next round. This block cipher function operation is more fully described in the aforementioned U.S. Pat. No. 3,958,081. A basic encipher/decipher operation of a message block of data starts with the loading of the cipher key from the terminal or host memory. This key is generally stored under master key encipherment to conceal its true value. Therefore, it is received as a block of data and deciphered under the master key to obtain the enciphering/deciphering key in the clear. The clear key does not leave the crypto device 12 but is loaded back in as the working key. The message block of data to be enciphered/deciphered is then transferred to the crypto device 12 and the cipher function is performed, after which the resultant message block of enciphered/deciphered data is transferred from the crypto device 12 to the terminal or host memory. If subsequent encipher/decipher functions are to be performed using the same working key, there is no need to repeat the initial steps of loading and deciphering the working key as it will still be stored in the working key register.

Figure 2:
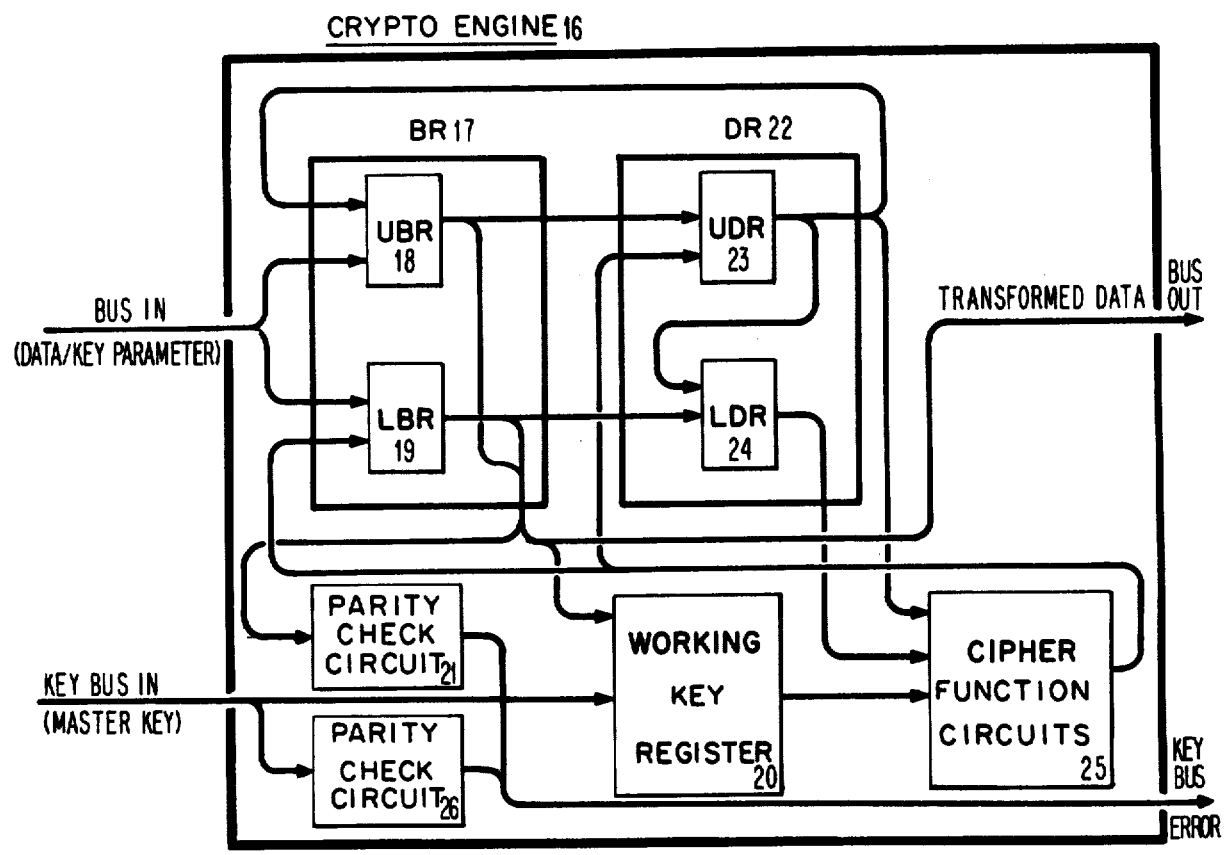
FIG. 2 is a block diagram of a cryptographic engine which performs cryptographic functions in a logically and physically secure manner.

The crypto device 12 includes duplicate crypto engines operating in synchronism to achieve checking by 100% redundancy. Referring now to FIG. 2, one of the crypto engines is shown in simplified block form with a heavy lined border signifying a secure area. The crypto engine 16 contains a 64 bit input/output buffer register 17 divided into upper and lower buffer registers 18 and 19 of 32 bits each. The buffer register 17 is used in a mutually exclusive manner for receiving input data on a serial by byte basis from the bus in, termed an input cycle, and for providing output data in a serial by byte basis to the bus out, termed an output cycle. Thus, during each input cycle a message block of eight data bytes is written into the buffer register 17 from the terminal or host memory while during each output cycle a message block of eight processed data bytes is read from the buffer register 17 to the terminal or host memory. Serial outputs of the buffer register 17 are also applied as serial inputs to the working key register 20 and a parity check circuit 21, the latter being controlled to be effective only when a 64 bit clear cipher key is to be loaded directly into the working key register 20 from the terminal or host memory via the buffer register 17. Only 56 of the 64 bits are stored in the working key register 20, the 8 parity bits being used only in the parity check circuit 21. The buffer register 17 is also provided with parallel input and output paths from and to a 64 bit data register 22 also divided into upper and lower data registers 23 and 24 of 32 bits each. The upper and lower data registers 23 and 24 each possesses parallel outputs and two sets of parallel inputs. The parallel inputs to the lower data register 24 being from the lower buffer register 19 and the upper data register 23 while the parallel inputs to the upper data register being from the upper buffer register 18 and from the lower data register 24 after modification by the cipher function circuits 25. The 64 bit master key is inputted to the crypto engine 16 on a serial by byte basis with each byte being checked for correct parity by the parity check circuit 26. As in the case of the cipher key transfer from the buffer register 17 to the working key register 20, only 56 of the 64 bits are stored in the key register 20, the 8 parity bits being used only in the parity check circuit 26. During the loading process, the key register 20 is configured as seven 8-bit shift right registers to accommodate the eight 7-bit bytes received from the MK memory 13 (or the buffer register 16).

When the working key is used for enciphering, the key register 20 is configured as two 28 bit recirculating shift left registers and the working key is shifted left, in accordance with a predetermined shift schedule, after each round of operation of the cipher function so that no set of key bits once used to perform a cipher operation is used again in the same manner. Twenty-four parallel outputs from each of the two shift registers (48 bits) are used during each round of the encipher operation. The shift schedule provided is such that the working key is restored to its initial beginning position at the end of the complete encipher operation.

When the working key is used for deciphering, the key register 20 is configured as two 28 bit recirculating shift right registers and the working key is shifted right in accordance with a predetermined shift schedule, after each round of operation of the cipher function so that again no set of key bits is used again. As in the enciphering operation, twenty-four parallel outputs from each of the two shift registers (48 bits) are used during each round of the decipher operation. The shift schedule provided in this case is also such that the working key is restored to its initial beginning position at the end of the complete decipher operation.

The cipher function circuits 25 perform a product cipher through successive application of a combination of non-linear substitutions and transpositions under control of the cipher working key. Sixteen rounds of the product cipher are executed in which the results of one round serves as the argument of the next round. Deciphering is accomplished by using the same key as for enciphering but with the shift schedule for shifting the key being altered so that the deciphering process is the reverse of the enciphering process, thus undoing in reverse order every step that was carried out during the enciphering process. During each round of the cipher function, the data contents of the upper data register 23, designated R, is enciphered under control of the working key, designated K, with the result being added modulo-2 to the contents of the lower data register 24, designated L, the operation being expressed as $L \oplus f(R,K)$. At the end of the cipher round, the contents of the upper data register 23 is parallel transferred to the lower data register 24 while the output of the cipher function circuits 25 is parallel transferred to the upper data register 23 to form the arguments for the next round of the cipher function. After a total of sixteen rounds, which completes the total cipher function, the contents of the upper data register 23 is parallel transferred to the upper buffer register 18 while the output of the cipher function circuits 25 is parallel transferred to the lower buffer register 19. The transformed data contents of the buffer register 17 is then outputted via the bus out to the terminal or host memory.

DSD Command and Orders

Input/output operations of an I/O device are generally directed by the execution of I/O instructions. In executing an I/O instruction, the processor in the case of terminals and the channel in the case of host systems generally provides an address field for addressing the I/O device, a command field for designating the operation to be performed and another address field for addressing the data field in memory from which data is fetched or to which data is stored.

The data security device 11 is responsive to a variety of commands as described in the aforementioned applications Ser. Nos. 857,533 and 857,532. However, for the purposes of the present invention the only commands used are (1) the PIO Write Data (PIOW) command which causes a data field to be loaded into the buffer register of the crypto device or the bits 0, 1, 2 and 3 of the data field to be stored in the MK memory when writing a master key therein (2) the PIO Read Data (PIOR) command which causes the contents of the buffer register of the crypto device, with correct parity, to be read out and passed via a data bus in to the terminal or host memory and (3) the Write DSD Order (WR DSD) command which designates cipher key handling and data processing orders. The subset of orders capable of being performed by a terminal and a host system are different, with the host system having a larger repertoire mainly because of the fact that key management functions are limited to host system control. The variety of orders capable of being performed by a terminal and host system and the manner in which they are carried out are fully described in the aforementioned applications Ser. Nos. 857,533 and 857,532. However, for the purposes of the present invention, there is a limited number of orders used which can be commonly performed by either the terminal DSD or the host DSD. These include (1) the Write Master Key order (WMK) which is used to control writing a master key into the MK memory (2) the Decipher Key order (DECK) which is used to control a decipher operation to decipher an operational key which is enciphered under a master key under control of the master key (3) the Encipher order (ENC) which is used to control the encipherment of data under control of a working key and (4) the Decipher (DEC) order which is used to control the decipherment of enciphered data under control of a working key.

DSD Functions

DSD cryptographic functions may be performed by combinations of the previously defined commands or by a combination of functions. These functions require an input to the cryptographic apparatus consisting of a key parameter or a data parameter. The notation used to describe these functions will be expressed as follows:

FUNCTION[KEY PARAMETER]→OUTPUT or

FUNCTION[DATA PARAMETER]→OUTPUT and when functions are combined, the notation used to describe the combined functions will be expressed as follows:

FUNCTION[KEY PARAMETER, DATA PARAMETER]→OUTPUT

The salient characteristics of host cryptographic functions are that (1) the key parameter, is always in enciphered form and therefore must be internally deciphered by the crypto engine before the clear key is used and that (2) no function allows keys to become available in clear form. The descriptions that follow describe what each function does and how it is performed. These functions are described in greater detail in the aforementioned applications Ser. Nos. 857,533 and 857,532 but the general description of these functions or combination of functions are given at this point to provide a better understanding of how the verification arrangements of the present invention are carried out. The descriptions may follow along with reference to FIG. 2 at times. In the diagrams which are referenced in the following, the cryptographic facility is shown in simplified block form for ease of understanding these operations.

Figure 3:
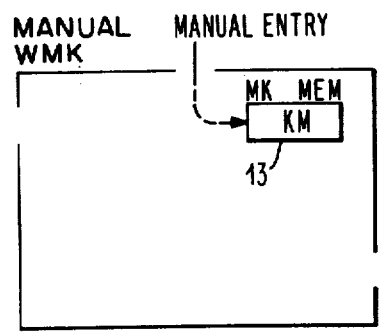
FIG. 3 illustrates in block diagram form a manual WMK function.

Before proceeding to the descriptions of the functions, a brief general description will be given of how the manual write key operation is performed. Referring now to FIG. 3, there is shown a simplified block diagram of a manual WMK operation. In the manual WMK operation, an EW switch is set on to enable writing into the MK memory 13 after which a MW switch is closed to enable manual writing and causing the current master key to be overwritten with whatever happens to be set in the data key entry switches. Following this, 16 sets of 4 bits (64 bits) are manually written into the MK memory 13 as the new master key to complete the manual WMK operation.

Figure 4:
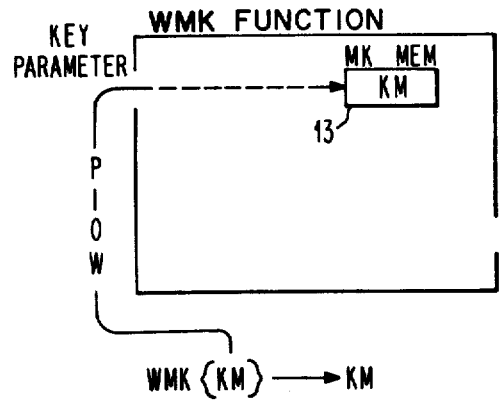
FIG. 4 illustrates in block diagram form a processor controlled WMK function.

Referring now to FIG. 4, there is shown a simplified block diagram of a write master key (WMK) function. This function is carried out by the following sequence of commands: (1) WMK and (2) 16 PIOW's. In this operation, as in the manual WMK operation, the EW switch is previously set on to enable writing into the MK memory 13. The execution of this function causes the current master key in the master key memory 13 to be over-written with whatever happens to be present as bits 0, 1, 2 and 3 on the bus in. Thereafter, the crypto engine controls are set to allow a 64 bit master key KM to be written as a key parameter into the MK memory 13 by means of 16 successive PIOW data commands with the bits 0, 1, 2 and 3 in the data fields associated with the 16 PIOW data commands constituting the new master key. The notation WMK[KM]→KM is used to describe this operation whereby the term WMK indicates the function, the contents of the brackets indicate the key parameter input to the MK memory 13 and the arrow points to the result.

Figure 5:
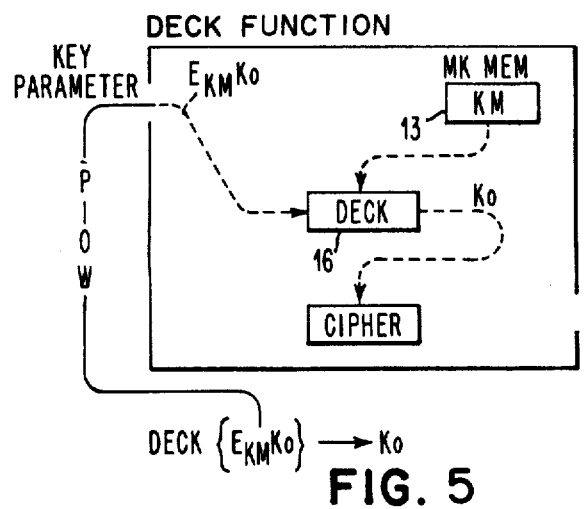
FIG. 5 illustrates in block diagram form a DECK function.

Referring now to FIG. 5, there is shown a simplified block diagram of a decipher key DECK function. This function is carried out by the following sequence of commands: (1) DECK and (2) 8 PIOW's. The execution of this function sets the crypto engine controls to first allow the master key KM in the MK memory 13 to be transferred to the crypto engine 16 as the working key. After or during the master key transfer, a 64 bit data block, defined as an operational key enciphered under the master key, is loaded as a key parameter into the crypto engine 16 by means of 8 successive PIOW data commands with the successive data fields associated with the 8 PIOW commands constituting the enciphered operational key. After the key parameter loading is completed, the crypto engine 16 performs a decipher operation to obtain the cipher key in clear form. The resultant clear cipher key does not leave the crypto engine 16 but is loaded back into the key register of the crypto engine 16 replacing the master key as the working key. The notation DECK[$E_{KM}KO$]→KO is used to describe this operation whereby the term DECK indicates the function, the contents of the bracket indicate the key parameter which is inputted to the crypto engine 16 and the arrow points to the result.

Figure 6:
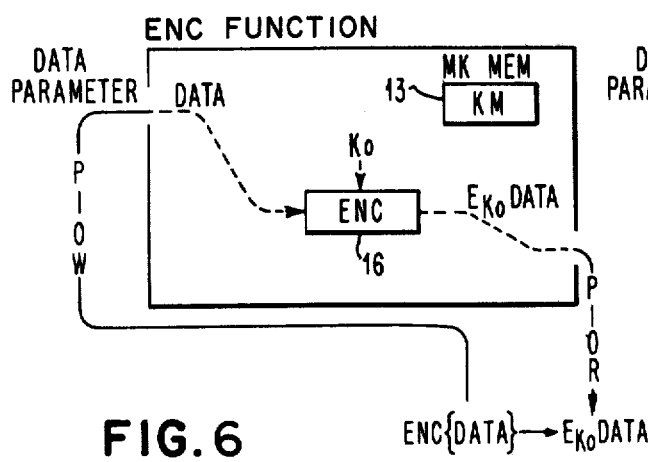
FIG. 6 illustrates in block diagram form an ENC function.

Referring now to FIG. 6, there is shown a simplified block diagram of an encipher (ENC) function. This function is carried out by the following sequence of commands: (1) ENC (2) 8 PIOW's and (3) 8 PIOR's. The execution of this function sets the crypto engine controls to the encipher mode of operation and allows a 64 bit message block of data to be loaded as a data parameter into the crypto engine 16 by means of 8 successive PIOW data commands with the successive data fields associated with the 8 PIOW commands constituting the message block of data to be enciphered. After the data parameter loading is completed, the crypto engine 16 performs an encipher operation to encipher the data parameter under the operational key presently stored in the working key register of the crypto device 16. The 64 bit enciphered result is transferred by a series of 8 PIOR commands from the crypto engine 16 for storage in designated data fields of the terminal or host memory. The notation ENC[DATA]→$E_{KO}$DATA is used to describe this operation whereby the term ENC indicates the function, the contents of the bracket indicate the data parameter input to the crypto engine 16 and the arrow points to the result.

Figure 7:
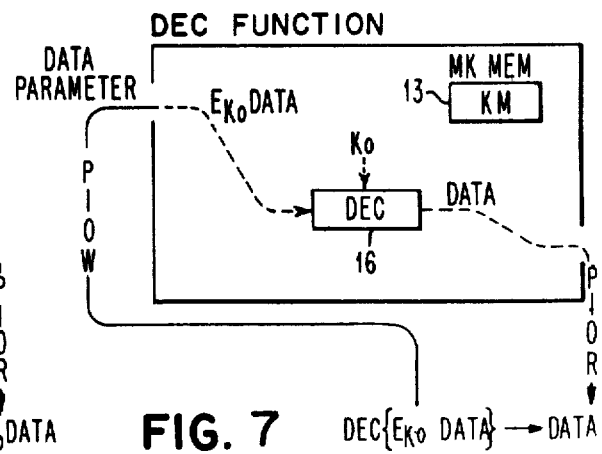
FIG. 7 illustrates in block diagram form a DEC function.

Referring now to FIG. 7, there is shown a simplified block diagram of a decipher (DEC) function. This function is carried out by the following sequence of commands: (1) DEC (2) 8 PIOW's and (3) 8 PIOR's. The execution of this function sets the crypto engine controls to a decipher mode of operation and allows a 64 bit message block of enciphered data to be loaded as a data parameter into the crypto engine 16 by means of 8 successive PIOW data commands with the successive data fields associated with the 8 PIOW commands constituting the message block of enciphered data to be deciphered. After the data parameter loading is completed, the crypto engine 16 performs a decipher operation to decipher the data parameter under control of the operational key presently stored in the working key register of the crypto engine 16. The 64 bit deciphered result is transferred by a series of 8 PIOR commands from the crypto engine 16 for storage in designated data fields of the terminal or host memory. The notation DEC[$E_{KO}$DATA]→DATA is used to describe this operation whereby the term DEC indicates the function, the contents of the bracket indicate the data parameter input to the crypto engine 16 and the arrow points to the results.

Figure 8:
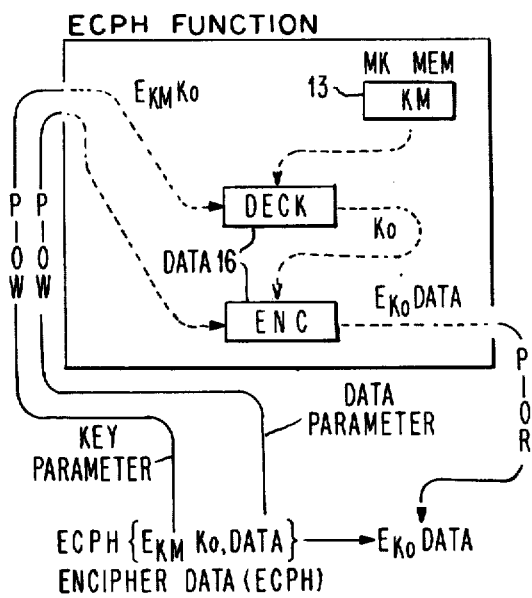
FIG. 8 illustrates in block diagram form an ECPH function.

Referring now to FIG. 8, there is shown a simplified block diagram of an encipher data (ECPH) function. This function is a combination of the DECK function and the ENC function and is carried out by the following sequence of commands: (1) DECK (2) 8 PIOW's (3) ENC (4) 8 PIOW's and (5) 8 PIOR's. Accordingly, in executing this function, the crypto engine controls are first set to the decipher key mode of operation by the DECK command causing the master key KM in the master key memory 13 to be transferred as the working key to the working key register of the crypto engine 16. After or during the master key loading, the key parameter of the function, consisting of an operational key enciphered under the master key, is loaded into the crypto engine 16 by means of 8 successive PIOW data commands. The crypto engine 16 then performs a decipher key operation to obtain the operational key in clear form which is then loaded back in as the working key of the crypto engine 16 replacing the previously loaded master key. The crypto engine controls are then set to an encipher mode of operation by the ENC command and the data parameter of the function, consisting of clear data, is loaded into the crypto engine 16 by means of 8 successive PIOW data commands. The crypto engine 16 then performs an encipher operation to encipher the data parameter under the present operational key. The enciphered result is then transferred by a series of 8 PIOR commands from the crypto engine 16 for storage in designated fields of the terminal or host memory. The notation $\text{ECPH}[E_{KM}\text{KO,DATA}] \rightarrow E_{KO}\text{DATA}$ is used to describe this operation whereby the term ECPH indicates the function, the contents of the bracket indicate the successive key parameter and data parameter inputs to the crypto engine and the arrow points to the result.

Figure 9:
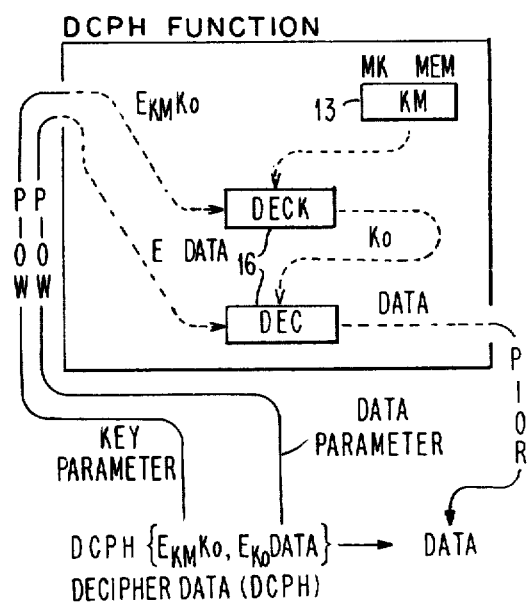
FIG. 9 illustrates in block diagram form a DCPH function.

Referring now to FIG. 9, there is shown a simplified block diagram of a decipher data (DCPH) function. This function is a combination of the DECK function and the DEC function and is carried out by the following sequence of commands: (1) DECK (2) 8 PIOW's (3) DEC (4) 8 PIOW's and (5) 8 PIOR's. The first part of this function is identical to that for the encipher data function insofar as loading an operational key in clear form as the working key of the crypto engine 16. After the operational key loading is completed, the crypto engine controls are then set to a decipher mode of operation by the DEC command and the data parameter of the function, consisting of DATA enciphered under the operational key, is loaded into the crypto engine 16 by means of 8 successive PIOW data commands. The crypto engine 16 then performs the decipher operation to decipher the data parameter under control of the present operational key. The deciphered result is then transferred by a series of 8 PIOR commands from the crypto engine 16 for storage in designated fields of the host memory 2. The notation $\text{DCPH}[E_{KM}\text{KO},E_{KO}\text{DATA}] \rightarrow \text{DATA}$ is used to describe this operation whereby the term DCPH indicates the function, the contents of the bracket indicate the successive key parameter and the data parameter inputs to the crypto engine and the arrow points to the result.

DETAILED DESCRIPTION OF THE INVENTION

In a data communication network employing cryptography for communication security of data communication sessions between stations of the network remote from one another, it is necessary to establish a common session or operational key at two of the stations of the network, in order to permit data enciphered at one station under control of the operational key at that station to be communicated to the other station over a communication line so that the enciphered data can be deciphered under control of the operational key at the other station in order to obtain the first station data in clear form at the second station. Likewise, by having the common operational key, data enciphered at the second station under control of the operational key at that station can be communicated over the communication line to the first station so that the enciphered data can be deciphered under control of the operational key at the first station in order to obtain the second station data in clear form at the first station.

In order to establish the common operational key at both stations, it is necessary to provide a protocol where the operational key established at one station can be communicated in protected form to the other station by enciphering the operational key under a communication key which is known by the receiving station so that the enciphered operational key can be deciphered at the receiving station to obtain the operational key in clear form to permit enciphering/deciphering data operations between the two stations. An opponent who wiretaps the communication line and records an entire communication session by day and attempts to decipher the enciphered data communication will be blocked inasmuch as he does not have available to him the communication key under which the operational key is enciphered. However, this communication may be exposed by a so called "midnight attack" in which the opponent who wiretapped the communication line and recorded the communication session gains unauthorized access at night to the station which received the communication session by day. Since the station has installed within its cryptographic facility the communication key which was used by the other station to communicate the enciphered operational key, the opponent can play back the recording into the terminal in such a manner that the station is unaware that it is in data communication with other than the other station. During the playback, the operational key enciphered under the communication key will be deciphered by the station's communication key to obtain the operational key in clear form as a working key for the cryptographic facility. The opponent may then play back the enciphered data of the other station and obtain the other station data in clear form.

The verification arrangement of the present invention will prevent this midnight attack as it permits the first station to send a challenge to the source of the data communication in accordance with the operational key at the first station requiring the source to reply with a cryptographic message in accordance with the operational key at the second station in such a form that the first station can verify that the source of the cryptographic message is in fact the second station only if the operational keys of the two stations are identical. The detailed descriptions which follow describe various embodiments of the verification arrangement of the present invention involving two stations which may be in a single or multiple domain communication network. In the case of a single domain network, the first station may consist of a remote communication terminal having a data security device, which is fully described in the co-pending application Ser. No. 857,533, and the second station may consist of a host system having a data security device, which is fully described in the co-pending application Ser. No. 857,532, and an associated application program. In the case of a multiple domain network, the first station may consist of a remote communication terminal having a data security device, as fully described in the aforementioned application Ser. No. 857,533, associated with a host system in one domain having a data security device, which is fully described in the co-pending application Ser. No. 857,531, or an application program associated with such a host system while the second station may consist of a similar type of communication terminal or application program associated with a similar type of host system in another domain of the multiple domain communication network. Additionally, the manner in which a communication session is established in a single domain network between a remote communication terminal and the associated host system is also fully described in the aforementioned co-pending application Ser. No. 857,532 while the manner in which a communication session is established in a multiple domain network between a remote communication terminal or application program associated with a host system in one domain and an application program of a host system in another domain of a multiple domain network is also fully described in the aforementioned co-pending application Ser. No. 857,531. Accordingly, in order to simplify and aid in the understanding of the present invention, simplified block diagrams are used to illustrate the cryptographic operations carried out by the cryptographic facility at each station.

Figure 10:
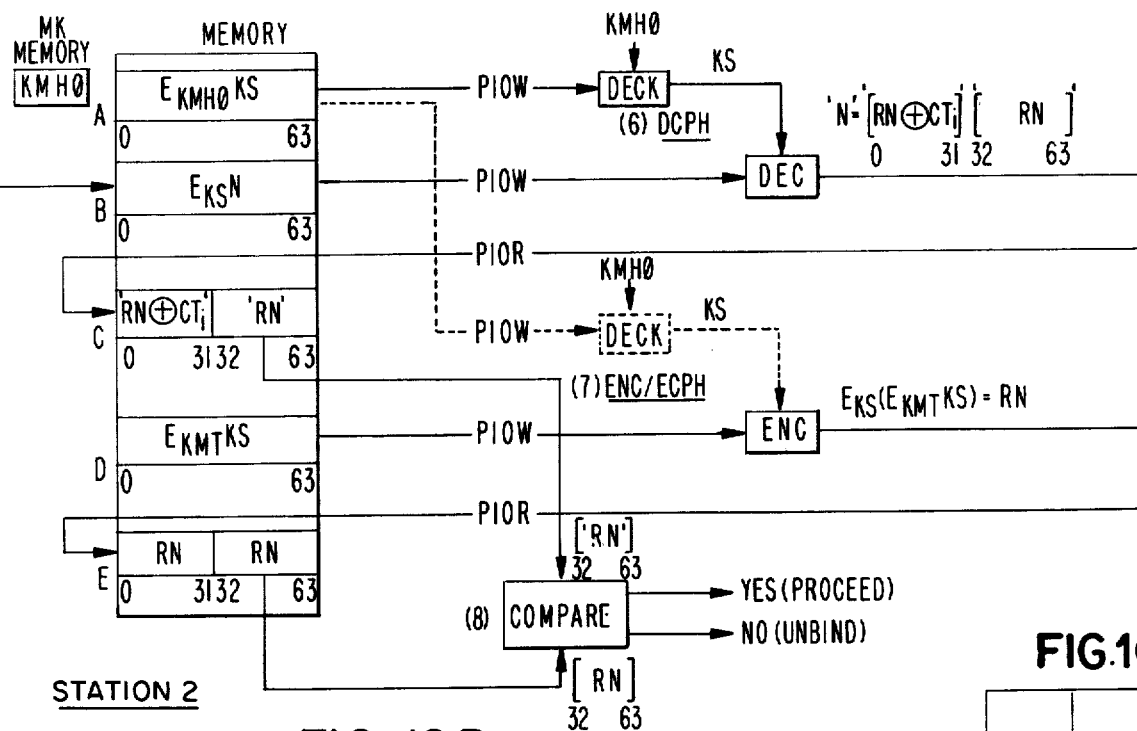
FIG. 10 is a diagram of how FIGS. 10a and 10b may be placed to form a detailed schematic diagram.

Referring now to FIGS. 10a and 10b, there is shown a block diagram of the verification arrangement showing a data communication from a first station to a second station. In order to further simplify and aid in the understanding of the present invention, let it be assumed that station 1 is a communication terminal and station 2 is a host system in either a single or multiple domain communication network. Further, let it be assumed that a communication session has been established between the two stations such that a common session or operational key now resides in location A of the host memory in the form $E_{KMH\phi}KS$ and in location F of the terminal memory in the form $E_{KMT}KS$, where $KMH\phi$ is the host system master key and KMT is the terminal master key, and that a copy of the operational key in the form $E_{KMT}KS$, which was communicated to the terminal by the host system, resides in location D of the host memory. Because of the fact that the crypto engine operates on a 64 bit basis, the data words in the terminal and host memories are shown, in simplified form, as containing 64 bit data words. The terminal and host memories may be random access type of memories, which are well known in the prior art, and which are addressable on a byte basis.

The description which now follows is keyed to numbered notations in the figures in order to aid in understanding the sequence of operations performed in carrying out the verification operation. Referring now to FIG. 10a, (1) an encipher ECPH function is first performed involving a combination of a decipher key DECK command operation followed by an encipher data ENC command operation. Accordingly, in executing this function, the terminal data security device is set to the decipher key mode of operation by the DECK command causing the terminal master key KMT to be read out of the master key memory and transferred as the working key of the working key register of the crypto engine. By a series of PIOW commands, the operational key enciphered under the terminal master key i.e. $E_{KMT}KS$, is read out of location F of the terminal memory and loaded into the crypto engine. The crypto engine then performs a decipher key operation to obtain the operational key KS in clear form which is loaded back in the working key register of the crypto engine as the working key replacing the previously loaded terminal master key KMT. The crypto engine controls are then set to an encipher data mode of operation by the ENC command and by another series of PIOW commands, the operational key enciphered under the terminal master key i.e. $E_{KMT}KS$, is again read out of location F of the terminal memory and loaded into the crypto engine. The crypto engine then performs an encipher operation to encipher the enciphered operational key under the working key i.e. KS, to obtain the enciphered result $E_{KS}(E_{KMT}KS)$ defined as being a pseudorandom number RN. The enciphered result RN is then transferred by a series of PIOR commands from the crypto engine for storage in location J of the terminal memory. (2) Half of the data word stored in location G is used as a general purpose counter for a variety of independent purposes. When an unpredictable number is required, the current count value CT is incremented by a constant 1 stored in location H by an ADD operation carried out by the terminal processor providing a new count having a value $CT_i$ which is stored back in location G. The other half of the data word in location G is a constant of all zeros. Consequently, the data word in location G now consists of the count value $CT_i$ and the all zeros value providing a number having a variable quantity for subsequent use. (3) The terminal processor now performs an exclusive OR operation by which the random number RN stored in location J is modulo-2 added to the data word in location G to provide a first verification number $N=(RN\oplus CT_i)$ (RN), the symbol $\oplus$ referring to the modulo-2 addition. The first verification number N is then stored in location K of the terminal memory.

(4) At this point, an encipher ENC or ECPH function is performed to encipher the first verification number N under the operational key KS to provide the enciphered result $E_{KS}N$ for transmission to the host system. If the terminal is a cluster type of terminal having other I/O devices associated with it for performing other communication sessions, the crypto engine may have been used for such other sessions and, as a result, the working key contained in the working register of the crypto engine may no longer contain the operational key for the present communication session. Therefore, under that circumstance, an ECPH function would be required in order to carry out another DECK operation to reload the operational key of the present communication session into the working key register of the crypto engine in order to properly carry out the encipher ENC operation on the verification number N. On the other hand, if the operational key of the present communication session still resides in the working key register of the crypto engine, then it is only necessary to perform the encipher ENC operation. Accordingly, the crypto engine controls are either already set for the encipher mode of operation as a result of the previous encipher operation or are set to this mode by a new ENC command if the cipher engine had been subsequently used for other communication sessions. By another series of PIOW commands, the first verification number is read out of location K of the terminal memory and loaded into the crypto engine and an encipher operation is carried out to encipher the first verification number N under the operational key KS to obtain the enciphered result $E_{KS}N$. The enciphered result $E_{KS}N$ is then transferred by a series of PIOR commands from the crypto engine for storage in location L of the terminal memory. (5) The first verification number enciphered under the operational key i.e. $E_{KS}N$, is now communicated from the terminal to the host system and, referring to FIG. 10b, is stored in location B of the host memory.

At this point, the host system can perform a verification operation to verify that the source of the enciphered message now stored in location B of the host memory came from the terminal if the operational key at the host system is identical to the operational key at the terminal. (6) Accordingly, a DCPH function is performed involving a combination of a decipher key DECk operation followed by a decipher data DEC operation. In executing this function, the host data security device is set to the decipher key mode of operation by the DECK command causing the host master key KMH$\phi$ to be read out of the master key memory and transferred as the working key to the working key register of the crypto engine. By a series of PIOW commands, the operational key enciphered under the host master key i.e. $E_{KMH\phi}KS$, is read out of location A of the host memory and loaded into the crypto engine. The crypto engine then performs a decipher key operation to obtain the operational key KS in clear form which is loaded back in the working key register of the crypto engine as the working key replacing the previously loaded host master key KMH$\phi$. The crypto engine controls are then set to a decipher data mode of operation by the DEC command and by another series of PIOW commands, the first verification number enciphered under the operational key of the terminal i.e. $E_{KS}N$, is read out of location B of the host memory and loaded into the crypto engine. The crypto engine then performs the decipher data operation to decipher the first verification number enciphered under the operational key of the terminal under control of host system to obtain a second verification number 'N' which should be equal to the first verification number N if the operational key of the host system is identical to the operational key of the terminal. The deciphered result 'N'='[RN⊕CT$_i$]''[RN]' is then transferred by a series of PIOR commands from the crypto engine for storage in location C of the host memory.

(7) At this point, an encipher ENC or ECPH function is performed to encipher the enciphered operational key i.e. $E_{KMT}KS$ stored in location D of the host memory under the operational key KS at the host memory to provide an enciphered result $E_{KS}(E_{KMT}KS)=RN$ which should be equal to the pseudo-random number RN previously produced at the terminal if the operational key at the host system is identical to the operational key at the terminal. Since the host system may be carrying out numerous communication sessions with other stations, it is possible that the crypto engine may be used for such sessions before an opportunity is provided to carry out the encipher operation. As a result, the working key contained in the working register of the crypto engine may no longer contain the operational key for the present communication session. Therefore, under that circumstance an ECPH function would be required in order to carry out another DECK operation to reload the operational key of the present communication session into the working key register of the crypto engine in order to properly carry out the encipher ENC operation on the copy of the operational key stored in location D of the host memory. On the other hand, if the operational key of the present communication session still resides in the working key register of the crypto engine, then it is only necessary to perform the encipher ENC operation. Accordingly, either the operational key of the host system is already present in the working key register or the DECK operation is performed to load the operational key of the host system into the working key register of the crypto engine. The crypto engine controls are then set to an encipher mode of operation by the ENC command and by a series of PIOW commands, the operational key enciphered under the terminal master key i.e. $E_{KMT}KS$, is read out of location D of the host memory and loaded into the crypto engine. The crypto engine then performs the encipher operation to encipher the data word read out of location D of the host memory under the operational key to obtain the enciphered result $E_{KS}(E_{KMT}KS)=RN$ which should be equal to the pseudo-random number previously produced at the terminal if the operational key of the host system is identical to the operational key of the terminal. The enciphered result RN is then transferred by a series of PIOR commands from the crypto engine for storage in location E of the host memory. It can be seen that the second half of the second verification number 'RN' stored in location C of the host memory should be equal to the second half of the random number RN stored in location E of the host memory if the operational key at the terminal and host system are identical. (8) Accordingly, the host system processor now performs a compare operation to compare the second portion of the data word in location C of the host memory i.e. 'RN' with the second portion of the data word in location E of the host memory i.e. RN to verify that the terminal was the source of the enciphered message $E_{KS}N$ only if the operational key at the host memory and the terminal are identical. If the two numbers compare, then the verification operation may proceed, whereas if the numbers do not compare, the host system may unbind the communication session thereby terminating further operation with the terminal.

At this point, the host system has verified that the terminal is the source of the enciphered message and that both the terminal and the host system are using identical operational keys. Now, the host system must provide a reply message back to the terminal to allow the terminal to verify that the host system is the other end of the communication session. In order to complete the handshaking protocol between the two stations and to allow the terminal to verify that the host system is the genuine source of the crypto-graphic data communication, it is necessary for the host system to create a reply message, in a form which is based upon the operational key at the host system, for transmission to the terminal to permit such verification only if the operational key at the terminal is identical to that at the host system.

Figure 11:
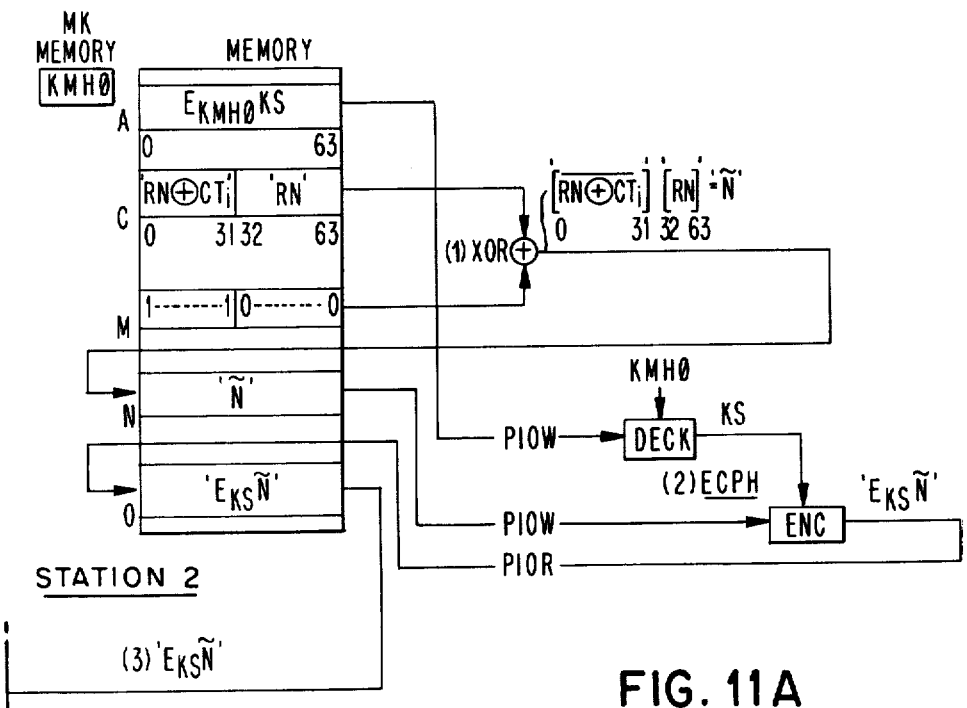
FIG. 11 is a diagram of how FIGS. 11a and 11b may be placed to form a detailed schematic diagram.
Figure 10:
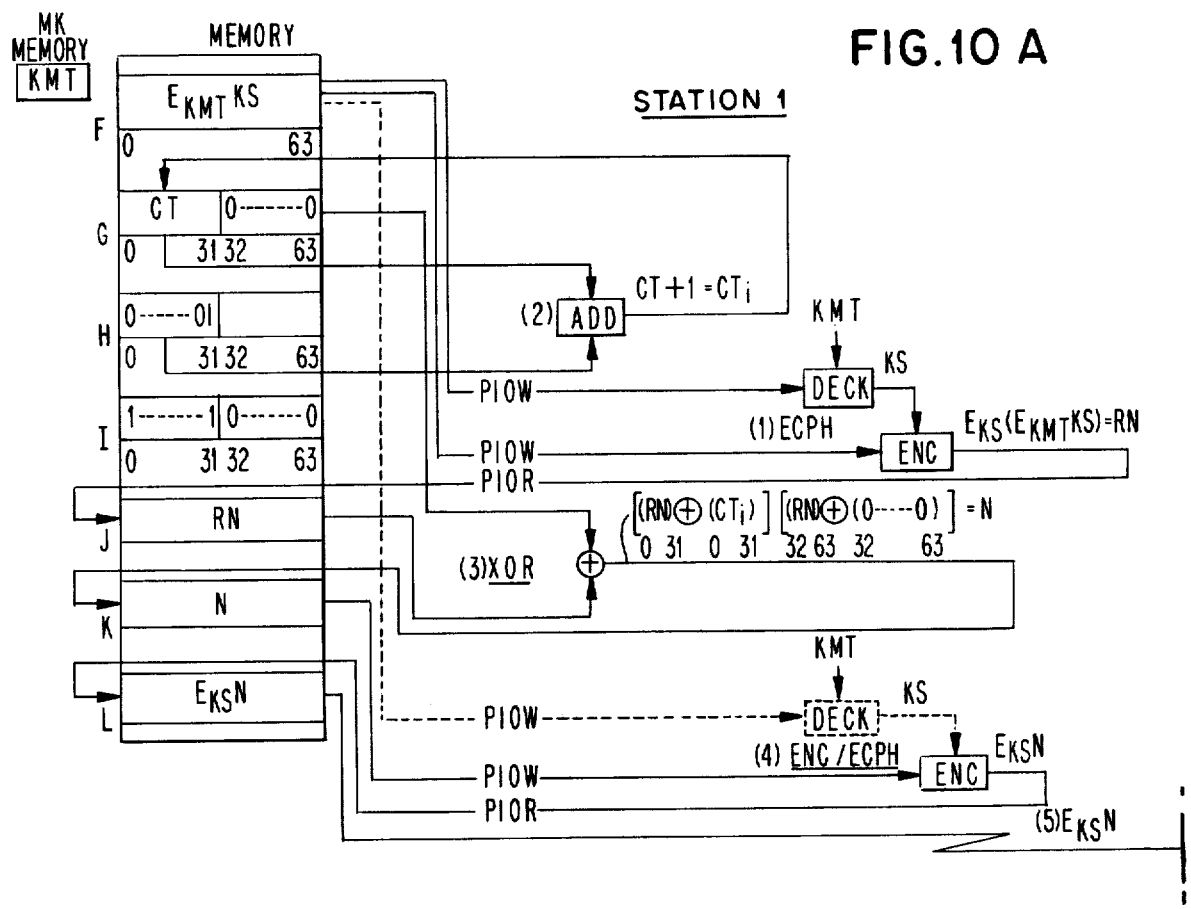
Figure 11B:
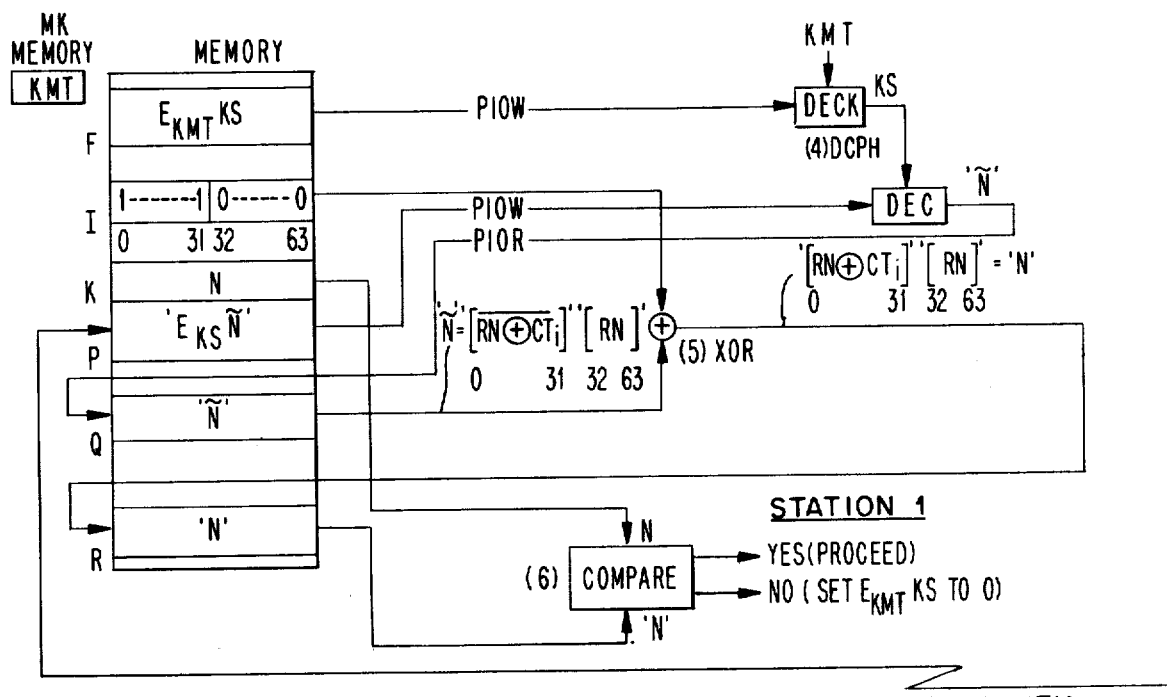

Referring now to FIGS. 11a and 11b, there is illustrated in block diagram form the second half of the handshaking protocol by which the host system in FIG. 11a provides a crypto-graphic data communication, based on the operational key at the host system, for transmission to the terminal in FIG. 11b to permit such verification at the terminal. (1) A first function is performed at the host system by which the second verification number 'N'='(RN⊕CT$_i$)''(RN)' is modified to obtain a modified second verification number $\bar{N}$. The host system processor accomplishes this function by performing an exclusive OR operation by which the second verification number stored in location C of the host memory is modulo-2 added to a constant consisting of four bytes of ones and four bytes of zeroes stored in location M of the host memory to provide a modified second verification number $\bar{N}$ in which the first four bytes of the second verification number are inverted and the second four bytes of the second verification number remain unchanged. The modified second verification number '$\bar{N}$' is then stored in location M of the host memory (2) An encipher ECPH function is next performed involving the combination of a decipher key DECK operation followed by an encipher data ENC operation. In executing this function, the host data security device is set to the decipher key mode of operation by the DECK command causing the host master key KMH$\phi$ to be read out of the master key memory and transferred as the working key to the working key register of the crypto engine. By a series of PIOW commands, the operational key enciphered under the host master key i.e. $E_{KMH\phi}KS$ is read out of location A of the host memory and loaded into the crypto engine. The crypto engine then performs a decipher key operation to obtain the operational key KS is clear form which is loaded back in the working key register of the crypto engine as the working key replacing the previously loaded host master key KMH$\phi$. The crypto engine controls are then set to an encipher data mode of operation by the ENC command and by another series of PIOW commands, the modified second verification number '$\tilde{N}$' is read out of location N of the host memory and loaded into the crypto engine. The crypto engine then performs the encipher operation to encipher the modified second verification number under the operational key KS to obtain the enciphered result '$E_{KS}\tilde{N}$'. The enciphered result is then transferred by a series of PIOR commands from the crypto engine for storage in location 0 of the host memory. (3) The modified second verification number enciphered under the operational key i.e. '$E_{KS}\tilde{N}$' is then communicated from the host system to the terminal and, referring to FIG. 11b, is stored in location P of the terminal memory.

At this point, since the terminal stores the first verification number in location K of the terminal memory, the terminal can perform a verification operation to verify that the source of the reply message now stored in location P of the terminal memory is the host system if the operational key at the host system is identical to the operational key at the terminal. This is accomplished at the terminal by deriving the second verification number which should be equal to the first verification number only if the operational keys are identical. (4) Accordingly, a decipher DCPH function is performed involving a combination of a decipher key DECK operation followed by a decipher data DEC operation. In executing this function, the terminal data security device is set to the decipher key mode of operation by the DECK command causing the terminal master key KMT to be read out of the master key memory and transferred as the working key to the working key register of the crypto engine. By a series of PIOW commands, the operational key enciphered under the terminal master key i.e. $E_{KMT}KS$, is read out of location F of the terminal memory and loaded into the crypto engine. The crypto engine then performs the decipher key operation to obtain the operational key KS in clear form which is loaded back in the working register of the crypto engine as the working key replacing the previously loaded terminal master key KMT. The crypto engine is then set to a decipher data mode of operation by the DEC command and by a series of PIOW commands, the enciphered modified second verification number received from the host system is read out of location P of the terminal memory and loaded into the crypto engine. The crypto engine then performs a decipher operation to decipher the enciphered modified second verification number under control of the operational key to obtain the modified second verification number '$\tilde{N}$' if the operational key at the terminal is identical to the operational key at the host system. The modified second verification number '$\tilde{N}$' is then transferred by a series of PIOR commands from the crypto engine for storage in location Q of the terminal memory.

(5) A second function is performed at the terminal which is the inverse of the first function tha was previously performed at the host system so that the modified second verification number '$\tilde{N}'=$'$(R\tilde{N}\oplus \tilde{C}T_i)$''(RN)' is modified in such a way as to obtain the second verification number in unmodified form. The terminal processor accomplishes this function by performing an exclusive OR operation by which the modified second verification number '$\tilde{N}$' stored in location Q of the terminal memory is modulo-2 added to a constant consisting of four bytes of ones and four bytes of zeroes stored in location I of the terminal memory in order to invert the first portion of the modified second verification number and to leave the second portion unchanged resulting in a number which is equal to the second verification number "N'. The second verification number 'N' is then stored in location R of the terminal memory. It can be seen that the second verification number 'N' stored in location R of the terminal memory should be equal to the first verification number N stored in location K of the terminal memory only if the operational key at the terminal is identical to the operational key at the host system. (6) The terminal processor next performs a compare operation to compare the first verification number N in location K of the terminal memory with the second verification number 'N' stored in location R of the terminal memory which should be equal to each other if the operational keys at the two stations are identical. If the two numbers compare, it verifies that the host system was the source of the cryptographic data communication and further cryptographic data communications may proceed between the terminal and the host system. On the other hand, if the two numbers do not compare, then the enciphered operational key stored in location F of the terminal memory is set to all zeroes to assure further communication between the terminal and the host system is inhibited. Therefore, with the verification arrangement of the present invention a dual verification has been provided whereby the host system verifies that the terminal is the source of cryptographic data communications only if the operational key at both stations are identical and the terminal verifies that the host system is the source of cryptographic data communications only if the operational key of the two stations are identical.

Figure 12:
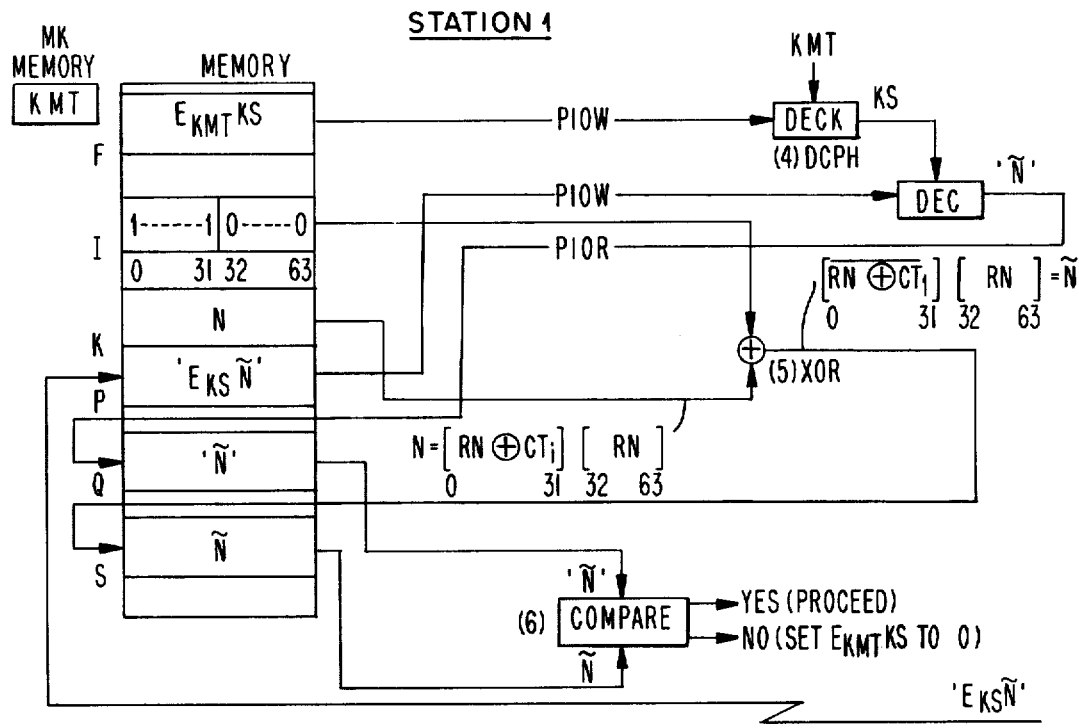
FIG. 12 is a detailed schematic diagram of another embodiment of the verification arrangement at one of the stations of the present invention.

Referring now to FIG. 12, there is shown, in block form, an embodiment of an alternative arrangement performed at one station to verify that the source of the cryptographic data communication is the other station if the operational key at the two stations is identical. In this arrangement, the modified second verification number enciphered under the operational key at the host system is deciphered at the terminal to obtain the modified second verification number in clear form and the terminal performs a function which is identical to the function performed by the host system to create a number which should be equal to the modified second verification number if the operational key at the terminal is identical to the operational key at the host system. Starting from the point where the enciphered modified second verification number has been received at the terminal and is stored in location P of the terminal memory, (4) a DCPH function is performed involving a combination of the decipher key DECK operation followed by a decipher data DEC operation. In executing this function, the terminal data security device is set to the decipher key mode of operation by the DECK command causing the terminal master key KMT to be read out of the master key memory and transferred as the working key to the working key register of the crypto engine. By a series of PIOW commands, the operational key enciphered under the terminal master key i.e. $E_{KMT}KS$, is read out of location F of the terminal memory and loaded into the crypto engine. The crypto engine then performs a decipher key operation to obtain the operational key KS is clear form which is loaded back in the working key register of the crypto engine as the working key replacing the previously loaded terminal master key KMT. The crypto engine controls are then set to a decipher data mode of operation by the DEC command and by another series of PIOW commands, the enciphered modified second verification number received from the host memory is read out of location P of the terminal memory and loaded into the crypto engine. The crypto engine then performs a decipher operation to decipher the enciphered modified second verification number to obtain the modified second verification number in clear form which is then transferred by a series of PIOR commands from the crypto engine for storage in location Q of the terminal memory. Since the second verification number should be equal to the first verification number if the operational keys at the terminal and the host system are identical, and if the terminal modifies the first verification number by the same function that was performed to modify the second verification number then the resulting modified first verification number should be equal to the modified second verification number if the operational keys at the terminal and the host system are identical. (5) Accordingly, the terminal processor now performs an exclusive OR operation by which the first verification number stored in location K of the terminal memory is modulo-2 added to a constant consisting of four bytes of ones and four bytes of zeroes stored in location I of the terminal memory to produce a result which inverts half of the first verification number and leaves the second half unchanged so as to produce a modified first verification number which should be equal to the modified second verification number if the operational keys at the terminal and the host system are identical. The modified first verification number is then stored in location S of the terminal memory. (6) The terminal processor then performs a compare operation to compare the modified first verification number stored in location S of the terminal memory with the modified second verification number stored in location Q of the terminal memory and if the numbers compare it verifies that the host system was the source of the cryptographic data communication if the operational key at the terminal and the host system are identical. On the other hand, if the two numbers do not compare, then the operational key enciphered under the terminal master key is reset to zero to assure further meaningful communications are inhibited.

Figure 13:
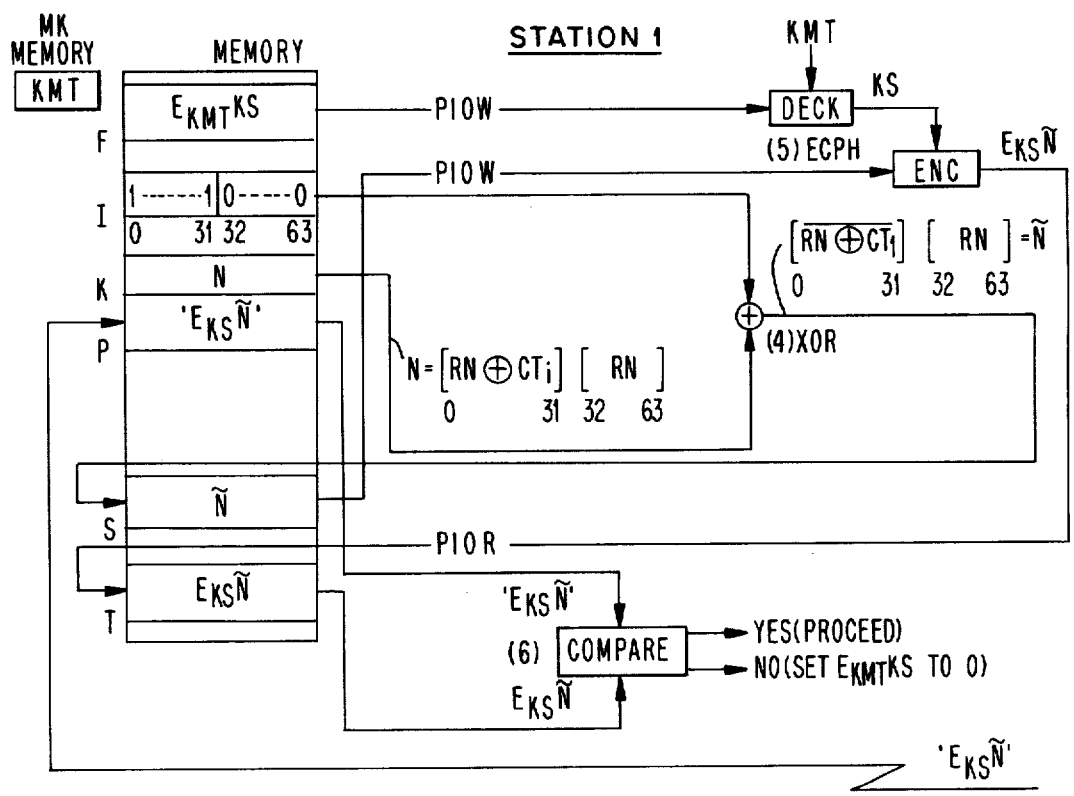
FIG. 13 is a detailed schematic diagram of still another embodiment of the verification arrangement at one of the stations of the present invention.

Referring now to FIG. 13, there is shown, in block form, an embodiment of still another alternative arrangement performed at one station to verify that the source of the cryptographic data communication is the other station if the operational keys at the two stations are identical. In this arrangement, since the first verification number should be equal to the second verification number if the operational keys at the terminal and at the host system are identical, then the first verification number may be modified by the same function that was performed at the host system to modify the second verification number to obtain a modified first verification number which should be equal to the modified second verification number if the operational keys at the terminal and the host system are identical and the modified first verification number can then be enciphered under the operational key at the terminal to obtain an enciphered modified first verification number which should be equal to the enciphered modified second verification number if the operational keys at the terminal and the host system are identical. Accordingly, starting from the point where the enciphered modified second verification number has been stored in location P of the terminal memory, (4) the terminal processor now performs an exclusive OR operation by which the first verification number N stored in location K of the terminal memory is modulo-2 added to a constant consisting of four bytes of all ones and four bytes of all zeroes to invert the first half of the first modification number and to leave the second half unchanged with the result being equal to a modified first verification number $\tilde{N}$ which should be equal to the modified second verification number if the operational keys at the terminal and at the host system are identical. The resulting modified first verification number $\tilde{N}$ is stored at location S in the terminal memory. (5) An encipher ECPH function is now performed which involves a combination of a decipher key DECK command operation followed by an encipher data ENC command operation. Accordingly, in executing this function, the terminal data security device is set to the decipher key mode of operation by the DECK command causing the terminal master key KMT to be read out of the master key memory and transferred as the working key to the working key register of the crypto engine. By a series of PIOW commands, the operational key enciphered under the terminal master key i.e. $E_{KMT}KS$, is read out of location F of the terminal memory and loaded into the crypto engine. The crypto engine then performs a decipher key operation to obtain the operational key KS in clear form which is loaded back in the working key register of the crypto engine as the working key replacing the previously loaded terminal master key KMT. The crypto engine controls are then set to an encipher data mode of operation by the ENC command and by another series of PIOW commands, the modified first verification number $\tilde{N}$ is read out of location S of the terminal memory and loaded into the crypto engine. The crypto engine then performs an encipher operation to encipher the modified first verification number under the operational key to obtain the enciphered result $E_{KS}\tilde{N}$ which is transferred by a series of PIOR commands from the crypto engine for storage in location T of the terminal memory. (6) The terminal processor now performs a compare operation to compare the enciphered modified first verification number stored in location T of the terminal memory with the enciphered modified second verification number stored in location P of the terminal memory to verify that the host system was the source of the enciphered message only if the operational key at the host system is identical to the operational key at the terminal. If the two numbers compare, then the communication session between the terminal and the host system may proceed whereas, if the numbers do not compare, then the operational key enciphered under the terminal master key $E_{KMT}KS$ is set to zeroes to assure further meaningful communication between the terminal and the host system is inhibited.

While the above description of the dual verification arrangement of the present invention has been described in terms of a communication terminal and a host system in a single or multiple domain data communication network, it will be apparent to those skilled in the art that the technique is equally applicable where the first station is an application program associated with a host system in one domain and the second station is an application program associated with a host system in another domain of a multiple domain data communication network. The establishment of a communication session in such an arrangement is fully described in the aforementioned co-pending application Ser. No. 857,531. In such arrangements, since the application programs do not have a cryptographic facility of their own, use is made of each host systems data security device. Accordingly, after a communication session is established between the two application programs, each host memory contains an operational key enciphered under the respective host master key e.g. $E_{KMH\phi j}KS$ and $E_{KMH0k}KS$ where j and k represent the different domains, and the operational key enciphered under the application key of the application program associated with one of the host systems e.g. $E_{KNAj}KS$, where KNA the application key associated with the application program is similar to KMT for purposes of the verification operation. Therefore, in this case, $E_{KNA}KS$ at one host system can be used, as was $E_{KMT}KS$, to create a pseudo-random number under control of the operational key deciphered by using $E_{KMH\phi j}KS$ in a DECK operation which may then be combined with a variable to establish a first verification number N for encipherment under the operational key at the one host system i.e. $E_{KS}N$ for transmission by the application program in one domain to the application program in the other domain. At the host system in the other domain, using the operational key enciphered under the other host system master key i.e. $E_{KMH\phi k}KS$ and the operational key enciphered under the application key i.e. $E_{KNAj}KS$ both of which are stored in the host memory of the host system in the other domain, a verification operation can be performed similar to that previously described to verify that the application program in one domain is the source of the cryptographic data communication to the application program in the other domain if the operational keys at the two host systems are identical. Similarly, by deciphering received message $E_{KS}N$ from the application program in the one domain and performing a similar function to invert half of the deciphered number N to obtain the number $\tilde{N}$, then, by using the operational key enciphered under the host master key of the host system in the other domain i.e. $E_{KMH\phi k}KS$, the modified number $\tilde{N}$ may be enciphered under the operational key at the other host system $E_{KS}\tilde{N}$ for transmission by the application program associated with the host system in the other domain to the application program associated with the host system in the one domain. In a manner similar to that described above, but using the operational key enciphered under the host master key i.e. $E_{KMH\phi j}KS$, of the host system in the one domain, the enciphered message $E_{KS}\tilde{N}$ can be deciphered to obtain the number '$\tilde{N}$' which by a similar function can be modified to obtain the number 'N' to verify that the source of the cryptographic data communication is the application program in the other domain. The alternative techniques of the verification arrangement can be equally used in this situation as well.

It will be apparent that the verification technique of the present invention provides assurance that the cryptographic keys at both stations are properly in place and working as to permit subsequent cryptographic data communications and that it will prevent the "midnight attack". The latter is assured since the verification number that may be wiretapped by the opponent during a particular session will not be equal to the verification number that is generated by the sending station for its authentication check. Thus, for example, if $N_1$ is the value generated by station 1 during the particular session which is wiretapped by the opponent, then at a later time, when the opponent plays the recording into station 1, a value $N_2$, where $N_2 \neq N_1$, will be generated by station 1 for its authentication check. The prior value of $E_{KS}\tilde{N}_1$ which was wiretapped by the opponent will not succeed when played back into station 1, since a comparison of $N_1$ and $N_2$, $\tilde{N}_1$ and $\tilde{N}_2$ or $E_{KS}\tilde{N}_2$ will fail.

While the invention has been described in terms of performing an encipher operation for enciphering data by use of an encipher command and performing a decipher operation for deciphering enciphered data by use of a decipher command, it will be recognized by those skilled in the art that these are inverse functions and, therefore, are not limited to those types of operations. Thus, a decipher operation may be used to encipher data and an encipher operation may then be used to decipher the enciphered data.

While the invention has been particularly shown and described with reference to the preferred embodiments hereof, it will be understood by those skilled in the art that several changes in form and detail may be made without departing from the spirit and scope of the invention.

What is claimed is:

1. In a data communication network providing communication security for data communication sessions between a first station and a second station where each station has cryptographic apparatus provided with an operational key for cryptographic operations which key is different for each said communication session, a process for operational key verification for each said communication session comprising the steps of:
   providing a first pseudo-random number at said first station representing said operational key in enciphered form,
   performing a cryptographic operation at said first station to encipher said first pseudo-random number under control of said operational key to obtain a second pseudo-random number having a first portion and a second portion,
   modifying one of said portions of said second pseudo-random number in an unpredictable manner to obtain a first verification number having a first portion and second portion with one of said portions being a modification of a corresponding portion of said second pseudo-random number and the other of said portions being identical to the other corresponding portion of said second pseudo-random number,
   enciphering said first verification number under control of said operational key at said first station for transmission to said second station,
   deciphering said enciphered first verification number under control of said operational key at said second station to provide a second verification number having a first portion and a second portion corresponding to said first and second portions of said first verification number,
   inverting one of said portions of said second verification number at said second station to provide a modified second verification number, enciphering said modified second verification number under control of said operational key at said second station for transmission to said first station, and performing an operation at said first station in accordance with said first verification number and said enciphered modified second verification number to verify that said second station is the source of the cipher transmission to said first station only if said operational key at said first station is identical to said operational key at said second station.

2. In the process as defined in claim 1 wherein said first station is a communication terminal and said second station is an application program associated with a host data processing system.

3. In the process as defined in claim 1 wherein said first station is a first communication terminal and said second station is a second communication terminal.

4. In the process as defined in claim 1 wherein said first station is a communication terminal associated with a host data processing system in one domain and said second station is an application program associated with a host data processing system in another domain of a multiple domain data communication network.

5. In the process as defined in claim 1 wherein said first station is a first application program associated with a host data processing system in one domain and said second station is a second application program associated with a host data processing system in another domain of a multiple domain data communication network.

6. In the process as defined in claim 1 wherein said first station is a first communication terminal associated with a host data processing system in one domain and said second station is a second communication terminal associated with a host data processing system in another domain of a multiple domain data communication network.

7. In the process as defined in claim 1 wherein the operation performed at said first station includes the steps of:

deciphering said enciphered modified second verification number under control of said operational key at said first station to provide said modified second verification number at said first station, inverting a portion of said modified second verification number at said first station which corresponds to said portion of said second verification number which was inverted at said second station to provide said second verification number at said first station, and comparing said first verification number with said second verification number at said first station to verify that said second station is the source of the cipher transmission to said first station only if said operational key at said first station is identical to said operational key at said second station.

8. In the process as defined in claim 1 wherein the operation performed at said first station includes the steps of:

deciphering said enciphered modified second verification number under control of said operational key at said first station to provide said modified second verification number at said first station, inverting a portion of said first verification number at said first station which corresponds to said portion of said second verification number which was inverted at said second station to provide a modified first verification number at said first station, and comparing said modified first verification number with said modified second verification number at said first station to verify that said second station is the source of the cipher transmission to said first station only if the operational key at said first station is identical to the operational key at said second station.

9. In the process as defined in claim 1 wherein the operation performed at said first station includes the steps of:

inverting a portion of said first verification number at said first station which corresponds to said portion of said second verification number which was inverted at said second station to provide a modified first verification number at said first station, enciphering said modified first verification number under control of said operational key at said first station, and comparing said enciphered modified first verification number with said enciphered modified second verification number at said first station to verify that said second station is the source of the cipher transmission to said first station only if said operational key at said first station is identical to said operational key at said second station.

10. In a data communication network providing communication security for data communication sessions between a first station and a second station where each station has cryptographic apparatus provided with an operational key for cryptographic operations which key is different for each said communication session, a process for operational key verification for each said communication session comprising the steps of:

providing a first pseudo-random number at said first station representing said operational key in enciphered form, performing a cryptographic operation at said first station to encipher said first pseudo-random number under control of said operational key to obtain a second pseudo-number having a first portion and a second portion, modifying one of said portions of said second pseudo-random number in an unpredictable manner to obtain a first verification number having a first portion and a second portion with one of said portions being a modification of a corresponding portion of said second pseudo-random number and the other of said portions being identical to the other corresponding portion of said second pseudo-random number, enciphering said first verification number under control of said operational key at said first station for transmission to said second station, deciphering said enciphered first verification number under control of said operational key at said second station to provide said first verification number at said second station, providing a third pseudo-random number at said second station representing said operational key in enciphered form corresponding to said first pseudo-random number, performing a cryptographic operation at said second station to encipher said third pseudo-random number under control of said operational key to obtain a second verification number having a first portion and a second portion corresponding to said first and second portions of said second pseudo-random number, and comparing said unmodified portion of said first verification number with the corresponding portion of said second verification number at said second station to verify that said first station is the source of the cipher transmission to said second station only if said operational key at said first station is identical to said operational key at said second station.

11. In a data communication network providing communication security for data communication sessions between a first station and a second station where each station has cryptographic apparatus provided with an operational key for cryptographic operations which key is different for each said communication session, a process for operational key verification for each said communication session comprising the steps of:

providing a first pseudo-random number at said first station representing said operational key in enciphered form, performing a cryptographic operation at said first station to encipher said first pseudo-random number under control of said operational key to obtain a second pseudo-number having a first portion and a second portion, modifying one of said portions of said second pseudo-random number in an unpredictable manner to obtain a first verification number having a first portion and a second portion with one of said portions being a modification of a corresponding portion of said second pseudo-random number and the other of said portions being identical to the other corresponding portion of said second pseudo-random number, enciphering said first verification number under control of said operational key at said first station for transmission to said second station, deciphering said enciphered first verification number under control of said operational key at said second station to provide said first verification number at said second station, providing a third pseudo-random number at said second station representing said operational key in enciphered form corresponding to said first pseudo-random number, performing a cryptographic operation at said second station to encipher said third pseudo-random number under control of said operational key to obtain a second verification number having a first portion and a second portion corresponding to said first and second portions of said second pseudo-random number, comparing said unmodified portion of said first verification number with the corresponding portion of said second verification number at said second station to verify that said first station is the source of the cipher transmission to said second station only if said operational key at said first station is identical to said operational key at said second station, inverting one of said portions of said first verification number at said second station to provide a third verification number, enciphering said third verification number under control of said operational key at said second station for transmission to said first station, and performing an operation at said first station in accordance with said first verification number and said enciphered third verification number to verify that said second station is the source of the cipher transmission to said first station only if said operational key at said first station is identical to said operational key at said second station.

* * * * *